United States Patent [19]
Shimose

[11] Patent Number: 5,339,126
[45] Date of Patent: Aug. 16, 1994

[54] ZOOM LENS BARREL

[75] Inventor: Takashi Shimose, Hachioji, Japan

[73] Assignee: Konica Corporation, Tokyo, Japan

[21] Appl. No.: 73,759

[22] Filed: Jun. 8, 1993

[30] Foreign Application Priority Data

| Jun. 17, 1992 | [JP] | Japan | 4-183125 |
| Aug. 4, 1992 | [JP] | Japan | 4-228055 |
| Oct. 16, 1992 | [JP] | Japan | 4-278445 |
| Dec. 15, 1992 | [JP] | Japan | 4-334588 |

[51] Int. Cl.$^5$ .......................................... G03B 1/18
[52] U.S. Cl. ........................... 354/195.12; 354/195.1; 354/195.11
[58] Field of Search .............. 354/195.12, 195.11, 354/195.1

[56] References Cited

U.S. PATENT DOCUMENTS

| 4,107,714 | 8/1978 | Raab | 354/195.12 |
| 5,150,260 | 9/1992 | Chigira | 354/195.1 |

Primary Examiner—Monroe H. Hayes
Attorney, Agent, or Firm—Jordan B. Bierman

[57] ABSTRACT

A lens system for controlling an exposure value through the lens system at variable focal lengths. The lens system includes a base; a front lens unit which is movably mounted on the base; a rear lens unit which is also movably mounted on the base; a lens mover for moving the front and the rear lens units; a guide shaft member for guiding the front and the rear lens units along the axial direction of the lens system; a operational shaft member which is disposed parallel to the axial direction of the lens system; a cam to rotate the operational shaft member; and a controller, to control the exposure vale, which is slidably connected to the operational shaft member along the shaft in accordance with the movement of the front and the rear lens units, and the controller is rotated in accordance with a rotation of the operational shaft member.

30 Claims, 22 Drawing Sheets

ZOOM LENS BARREL

BACKGROUND OF THE INVENTION

The present invention relates to improvement of a zoom lens barrel.

Generally, in a zoom lens barrel of a mechanical compensation type, multiple groups of movable lenses, by which variable magnification and focal position adjusting operations are carried out, are optically moved relatively using multiple cam displacement units, the characteristics of the displacement amounts of which are different from each other.

Especially, in a compact camera, an exposure control member such as a shutter, and a diaphragm, are arranged between a front lens group and a rear lens group, a so-called between-shutter, and generally operations of these members are electrically controlled by a microcomputer which is connected by a flexible board provided in the camera.

On the other hand, in a single use camera or a mono-focal-point camera, generally, a mechanical shutter is used in which: a shutter is charged by a film winding operation; the charged condition is released when a shutter button is pressed; and shutter speed is controlled by the spring force.

Also in a zoom lens in which a shutter position and a diaphragm position are moved in the optical direction for short and long focal points, no problem is caused in the structure since the electric shutter is connected with the flexible board. However, since the cost of the shutter, the flexible board, and the microcomputer in the camera is high, they are appropriate for a high class camera. When a low cost camera having a zoom lens is structured, the cost of the zoom lens is too high.

Since the structure of the mechanical shutter is simple and the cost is low, it is effective for a camera such as the single use camera. However, in the zoom lens in which shutter and diaphragm positions are changed, the transmission of the operation force is difficult. When, for example, the operation force is transmitted by a shaft pin or the like, there are problems in which reliability of the shutter speed for a short focal point is varied from that for a long focal point, and the numbers of parts are increased.

Therefore, the first object of the present invention is to provide a low cost zoom lens barrel by which a highly reliable operation can be accomplished even in a zoom lens in which an exposure control member is moved in the direction of the optical axis.

Generally, in a zoom lens barrel, a lens frame is moved in the direction of the optical axis when a cam groove provided on a cam barrel or cam plate is engaged with a cam pin provided in the lens frame, Clearance is necessary to a certain extent so that the cam groove is slidably engaged smoothly with the cam pin. However, the clearance causes error or fluctuation in the direction of the optical axis of the zoom lens. In order to prevent the foregoing problems, a countermeasure is adopted in which the lens frame is pushed in the direction of the optical axis of the zoom lens, and the cam pin comes into contact with only one side wall of the cam groove. Such a countermeasure is required especially in the case where the cam member is formed by resin molding from the following reasons: a slope is provided on one side surface of the cam groove so that a metallic mold, by which the cam groove is formed, can be easily removed; and only the other surface of the cam groove is used for the cam.

FIG. 25 shows an example in which the lens frame of a two-group zoom lens, which is commonly used for a still camera, is pushed in the direction of the optical axis. In this example, the following operations are carried out: a compression spring 403 is provided between a lens frame 401 holding a front lens group G1 and a lens frame 402 holding a rear lens group G2; the lens frame 401 is pushed towards the left in the direction of the optical axis, and the lens frame 402 is pushed towards the right in the direction of the optical axis; a cam pin 404 provided to the lens frame 401 is moved in the direction of the optical axis by the left side surface of a cam groove 405a for a front lens group of a cam barrel 405 rotating around the optical axis; and a cam pin 406 provided to a lens frame 402 is moved in the direction of the optical axis by the right side surface of a cam groove 405b for a rear lens group of a cam barrel 405. Numeral 407 is a fixed barrel, numerals 407a and 407b are guide grooves provided to the fixed barrel 407 by which lens frames 401 and 402 are respectively guided in the direction of the optical axis.

FIG. 26 shows an example in which a lens frame commonly used for a video camera is pushed in the direction of the optical axis. In this example, a lens frame 410 is pushed towards the left by a coil spring 411 provided between the lens frame 410 and the fixed barrel 407 under the condition that the lens frame 410 of a variable magnification lens group G3 which is guided in the direction of the optical axis by guide bars 408 and 409 supported by the fixed barrel 407 in parallel with the optical shaft, is penetrated by the guide bar 408. Accordingly, a cam pin, not shown in the drawing, provided in the lens frame 410 is moved in the direction of the optical axis by the left side surface of the cam groove of the cam member, not shown in the drawing.

In the conventional lens frame pushing method in the zoom lens barrel in the direction of the optical axis, there are the following problems, in which:

A. The pushing force by a spring in the case of a long focal point is varied from that in the case of a short focal point because the position of the zoom lens in the direction of the optical axis in the case of the long focal point is changed from that in the case of the short focal point, and accordingly, the driving force for a zooming operation is changed;

B. Since it is commonly known that the ratio of the coil spring length in the case where it is not activated, to the coil spring length in the case where it is activated, is not more than three, the change of the coil spring length in the case where it is activated is limited so that the ratio is not more than this value, in the case of a long focal point and in the case of a short focal point, and especially in the example shown in FIG. 26, the amount of the movement of a zooming operation is limited;

C. There is a possibility that the optical path is obscured, especially in the example shown in FIG. 25, when the coil spring is compressed and bent, and in order to avoid the foregoing possibility, when the diameter of the coil is increased, or a guide is provided, or a conical coil spring is used, a zoom lens barrel becomes large, and cost is increased;

D. Since the directions of working points of the spring and cam to the lens frame are respectively deflected in the direction crossing at right angles with the optical axis, there are the following problems: the spring and cam give force to the lens frame and the lens frame is inclined; in the example shown in FIG. 25, the lens frame 401 is inclined clockwise, and the lens frame 402 is inclined counterclockwise; in the example shown in FIG. 26, although the application point of the cam to the lens frame 410 is not shown in the drawing, when, for example, the application point is outside the guide bar 408, the lens frame 410 is inclined clockwise; and therefore, twisting is easily caused when the lens is inclined, or the lens is moved in the direction of the optical axis.

The present invention is also proposed to solve the foregoing problems. The second object of the present invention is to provide a zoom lens barrel in which: errors and fluctuations of a zooming operation caused by engagement clearance between a cam groove and a cam pin are prevented; the driving force for the zooming operation is reduced; the amount of movement for zooming can be increased; there is no possibility that a coil spring interferes with the optical path; and the spring and cam do not give force to a lens frame.

Further, the cost of a front lens group advancing motor, a microcomputer for the camera, an optical range-finding system and the like is high in an automatic focusing adjusting mechanism. Accordingly, the mechanism is suitable for a high class compact camera, but is not suitable for a low cost zoom-camera. In an ordinary picture taking range, a fixed focus type camera can be used for taking a picture on which focusing is carried out in a relatively good condition, however, there is a problem in which a subject is out of focus at infinity, or within a range in which a strobe light is used, or in a close-up photographic range within 1 m. In order to solve the foregoing problem, there is a camera such as a mono-focus camera of a film exchange type, in which an infinity-button, or a macro-button is provided so that a lens can be moved from a focusing position for an ordinary photographic distance to a focusing position for an infinite distance or a predetermined short distance when the button is pressed. However, in a zoom lens, the position of which is changable, at moment by moment a mechanism to move the lens to a focusing position becomes complicated, and the numbers of parts are increased.

The present invention has been proposed in order to solve the foregoing problems, and the third object of the present invention is to provide a variable focusing lens barrel in which: the focusing operation can be switched in two steps from the condition in which a photographic subject at a predetermined short distance is in focus, to the condition in which the subject at a longer distance is in focus; therefore, variable magnification photographing in focus can be carried out within a range from the short distance to the long distance; the structure is simple and the number of parts is small; the cost is low; and a highly reliable operation can be carried out.

SUMMARY OF THE INVENTION

The first object of the present invention can be accomplished by a zoom lens barrel in which: a lens frame is slidably supported by guide shafts provided to a barrel main body; the movement of the lens frame in the direction of the optical axis is regulated by the guide shafts; an exposure control member is engaged with the guide shafts in the manner that the exposure control member can be integrally rotated with the guide shafts and can be moved in the direction of the shaft; and the exposure control member can be operated when the guide shafts are rotated.

Further, in a zoom lens barrel in which a lens frame is slidably supported by guide shafts provided to a barrel main body, and the movement of the lens frame in the direction of the optical axis is regulated by the guide shafts, operational shafts are provided in parallel with the guide shafts, being separately provided from the guide shafts, an exposure control member is engaged with the operational shafts in the manner that the exposure control member can be integrally rotated with the operational shafts and can be moved in the direction of the shaft; and the exposure control member can be operated when the operational shafts are rotated.

The exposure control member is a shutter or a diaphragm.

In the present invention, the lens frame is slidably supported by the guide shafts provided to the barrel main body, the movement of the lens frame in the direction of the optical axis is regulated by the guide shafts, and the exposure control member can be moved in the direction of the shaft by the guide shafts, and is operated when the guide shafts are rotated.

Further in the present invention, the lens frame is slidably supported by the guide shafts provided to the barrel main body, the movement of the lens frame in the direction of the optical axis is regulated by the guide shafts, the exposure control member is moved in the direction of the shaft by the operational shafts which are separately provided from the guide shafts and provided in parallel with the guide shafts, and the exposure control member is operated when the operational shafts are rotated.

Further, the exposure control member is a shutter or a diaphragm, and the shutter or diaphragm can be operated when the guide shafts or the operational shafts are rotated.

Further, a disk cam having a cam groove is provided along the moving direction of the lens, an arm member rotatably provided along the moving direction of the lens is engaged with the cam groove of the disk cam, and the lens is connected with the arm member in a different position from the cam groove. According to the foregoing, the arm member engaged with the cam groove of the disk cam is rotated along the cam groove when the disk cam is rotated in either direction. The lens is provided in a different position from the position in which the cam groove is provided, for example, at a position further than the distance from the rotational center of the arm member to the engaged point of the cam groove. As a result of the foregoing, the movement amount of the lens can be made larger than that in the case where the lens is directly moved by the cam groove. Accordingly, a small disk cam can cope with the movement of the lens even when the movement amount of the lens is large. Further, the distance to the mounting position of the lens is shorter than that from the rotational center of the arm member to the cam groove. As a result of the foregoing, the movement amount of the cam groove can be decreased, and the lens, the movement amount of which is minute, as with an aberration compensation lens, can be accurately driven.

The second object of the present invention can be accomplished by a zoom lens barrel in which: a lens frame is not directly driven by a cam, but by a lever for movement in the direction of the optical axis; the lever is driven when the cam force is applied to the lever; the lens frame is driven in the direction of the optical axis by the lever; and the lever is urged for rotation in one direction by an elastic member connected with the lever at a position slightly apart from the fulcrum of the lever. Therefore, the following advantages can be obtained: errors or fluctuation of the zooming position caused by the engagement clearance between the cam and the lever are reduced; the change in the moving length of the elastic member is small, and the change of the driving force for zooming is small; the movement amount for zooming can be changed by a lever ratio with respect to the movement amount in the direction of the optical axis which is given by the cam, so that the movement amount for zooming can be large; the elastic member does not obscure the optical path; the cam and the elastic member do not give force to the lens frame; and accordingly, there is no possibility that the lens is inclined, so that the movement in the direction of the optical axis of the lens frame can be smoothly carried out.

Further, the third object of the present invention can be accomplished by a zoom lens structured as follows: in the engagement of the cam with the lever of the cam member in the zoom lens barrel, the cam groove is engaged with a cam pin which has a diameter smaller than the width of the cam groove so as to create a certain clearance therebetween; the urging force for rotation in one direction is given to the lever in the manner that the cam pin comes into contact with only one side surface of the cam groove; and the direction of the urging force can be switched in the manner that the cam pin comes into contact with only the other surface of the cam groove corresponding to photographing for short distance or photographing for a longer distance.

The object of this example can be accomplished by a zoom lens structured as follows: in the engagement of the lens frame with the lever of the cam member in the zoom lens barrel, a sliding groove provided in the lens frame is engaged with a sliding pin which has a diameter smaller than the width of the sliding groove so as to create a certain clearance therebetween; and contact of the sliding pin with one side surface of the sliding groove can be switched to contact of the sliding pin with the other surface of the sliding groove corresponding to photographing for short distance or photographing for a longer distance.

Further, the shape of the cam of the cam member in the zoom lens barrel of the foregoing invention can be formed in the manner that the lens frame is moved in the direction of the optical axis so that the focal distance is changed stepwise, and the focusing distance is continuously changed from a long distance to a short distance or any step therebetween.

Further, the lever and the cam member, and a base on which the driving means of the cam member is provided, can be moved in the direction of the optical axis.

Further, the zoom lens barrel of the invention can be structured in the manner that: the lens frame holding the lens group is held by a moving frame, which is moved for zooming, following the cam and guided by a plurality of guide shafts provided in parallel with the optical axis in a helicoidal engagement; a rotating shaft which is provided in parallel with the optical axis and can be rotated by an operational member is provided in common with the guide shaft or separately from the guide shaft; a rotating member is provided which can be rotated integrally with the rotating shaft and moved integrally with the moving frame; and the lens frame is moved with respect to the moving frame when the rotating member is rotated.

Further, the zoom lens barrel of the present invention can be structured in the manner that: a plurality of diaphragm members which can be relatively displaced along a surface perpendicular to the optical axis, are provided in a moving frame, which is moved for zooming, following the cam and guided by a plurality of guide shafts provided in parallel with the optical axis; a rotating shaft, which is provided in parallel with the optical axis and can be rotated by an operational member, is provided in common with the guide shaft or separately from the guide shaft; a rotating member is provided which can be rotated integrally with the rotating shaft and moved integrally with the moving frame; and a plurality of diaphragm members are relatively displaced when the rotating members are rotated.

In the zoom lens barrel in the example by which the third object can be accomplished, the side surface of the cam groove, which is used for moving the lens group in the zooming operation, can be switched from one surface to the other when the direction of the urging force for rotation which is given by the elastic member is changed; and therefore, the magnification can be continuously changed, and accurately focused photographing for a short distance and a longer distance can be carried out when one side surface is the cam surface when a subject in a predetermined short distance accurately focused, and the other surface is the cam surface when the subject in a longer distance is accurately focused. Accordingly, the following advantages can be obtained: the structure is simple; the numbers of parts are small; the cost is low; and highly reliable operation can be carried out.

Further, in the example, in the case where the engagement of the cam groove of the cam member with the cam pin of the cam lever is not used for switching the focusing distance, but the engagement of the sliding groove provided on one end of the lens frame with the sliding pin provided on one end of the lever is used for switching the focusing distance, the subject in the distance longer than the predetermined short distance is accurately focused when one side surface of the sliding groove is engaged with the sliding pin, and the subject in the short distance is accurately focused when the other surface of the sliding groove is engaged with the sliding pin.

Further, in the example, in the range in which the focal distance is not changed by the shape of the cam, when the focusing distance is continuously changed from the long distance to the short distance or on the contrary, the automatic focusing operation is carried out by specifying a magnification ratio, so that a switching means by engagement of the cam groove with the cam pin is not necessary.

Further, in the example, the lever and the cam member, and the driving means of the cam member are provided on the base which can be moved in the direction of the optical axis, and therefore the focusing operation can be carried out when the zoom lens group is moved in the direction of the optical axis by movement of the base, so that the automatic focusing operation can be easily carried out. Further, the switching and moving mechanism for the base position can be used also for the flange-focusing adjusting mechanism, and accordingly, the structure is comparatively simple, and the base can be also used for a cover.

Further, in the example, a lens group holding frame engaged by helicoidal engagement with the moving frame for zooming is rotated and moved in the direction of the optical axis when a rotating shaft, provided in parallel with the optical axis, which is provided in connon with the guide shaft or separately provided from the guide shaft is operated for rotation, and therefore, the focusing operation can be easily carried out for short and long distance photographing, and its structure is comparatively simple.

In the example, the F-number is changed when a plurality of diaphragm members provided in the moving frame for zooming are relatively displaced in the same manner that the lens group holding frame is rotated by the rotating shaft. Then, appropriately focused photographing can be carried out within a photographing range broader than that of the fixed focus lens, and the structure is comparatively simple, as follows: the diaphragm is opened corresponding to the strobe light photographing distance to prevent under-exposure; the diaphragm is closed in the long distance photography so that the F-number of the lens is increased and appropriate focusing can be obtained within a broad range by the depth of field; or the diaphragm is closed in strobe light photography at the distance shorter than a predetermined distance to prevent over-exposure.

DETAILED DESCRIPTION OF THE INVENTION

Figure 1:
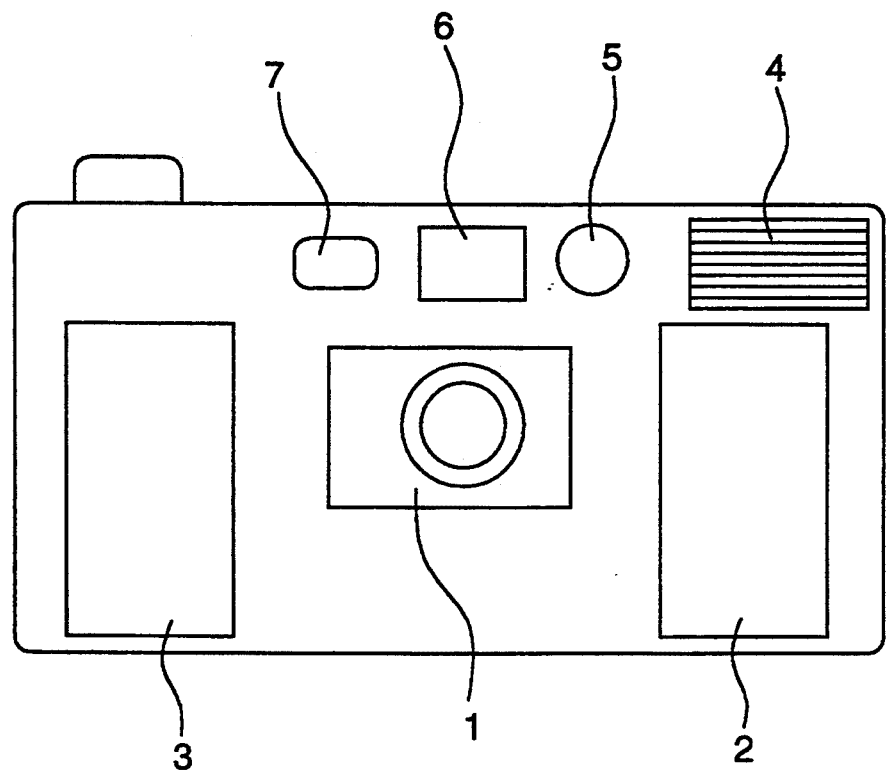
FIG. 1 is a front view of a camera in which a zoom lens barrel is provided.

Referring to the drawings, an example, by which the first object of the present invention is accomplished, will be explained as follows. FIG. 1 is a front view of a camera in which a zoom lens barrel of the present invention is provided. A zoom lens barrel 1 is provided in the center of the camera. A film magazine chamber 2 and a spool chamber 3 are provided in the camera in the lateral direction with respect to the zoom lens barrel 1. A strobe 4 is provided to an upper portion of the magazine chamber 2. An AE metering section 5, a view finder 6 and an AF optical system 7 are provided above the zoom lens barrel 1. The shape of the zoom lens barrel 1 is a box type which is long in the lateral direction and short in the vertical direction, and therefore the zoom lens barrel 1 does not affect each member provided above the barrel.

Figure 2:
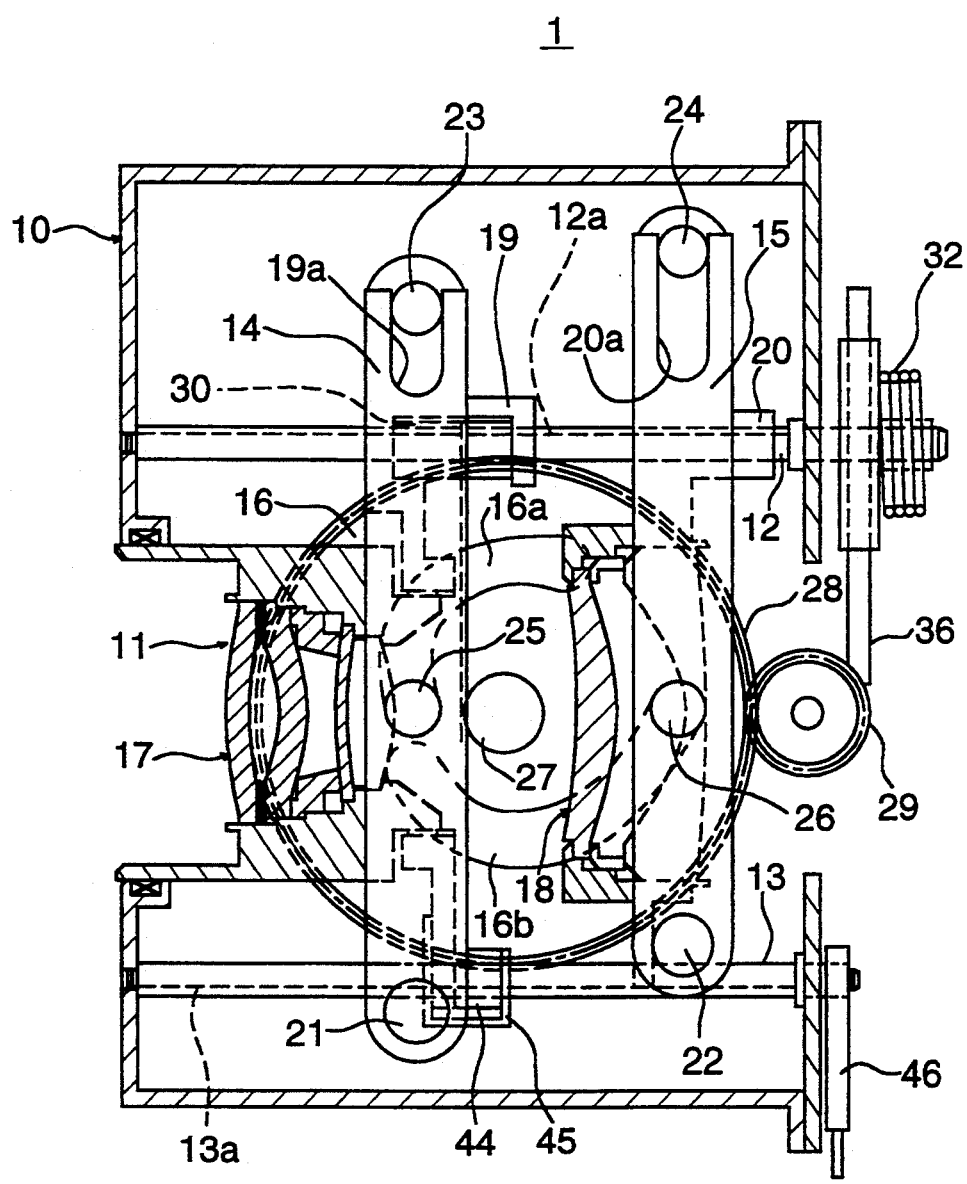
FIG. 2 is a plan view of the zoom lens barrel in the case of a short focal distance according to an example of the present invention.
Figure 3:
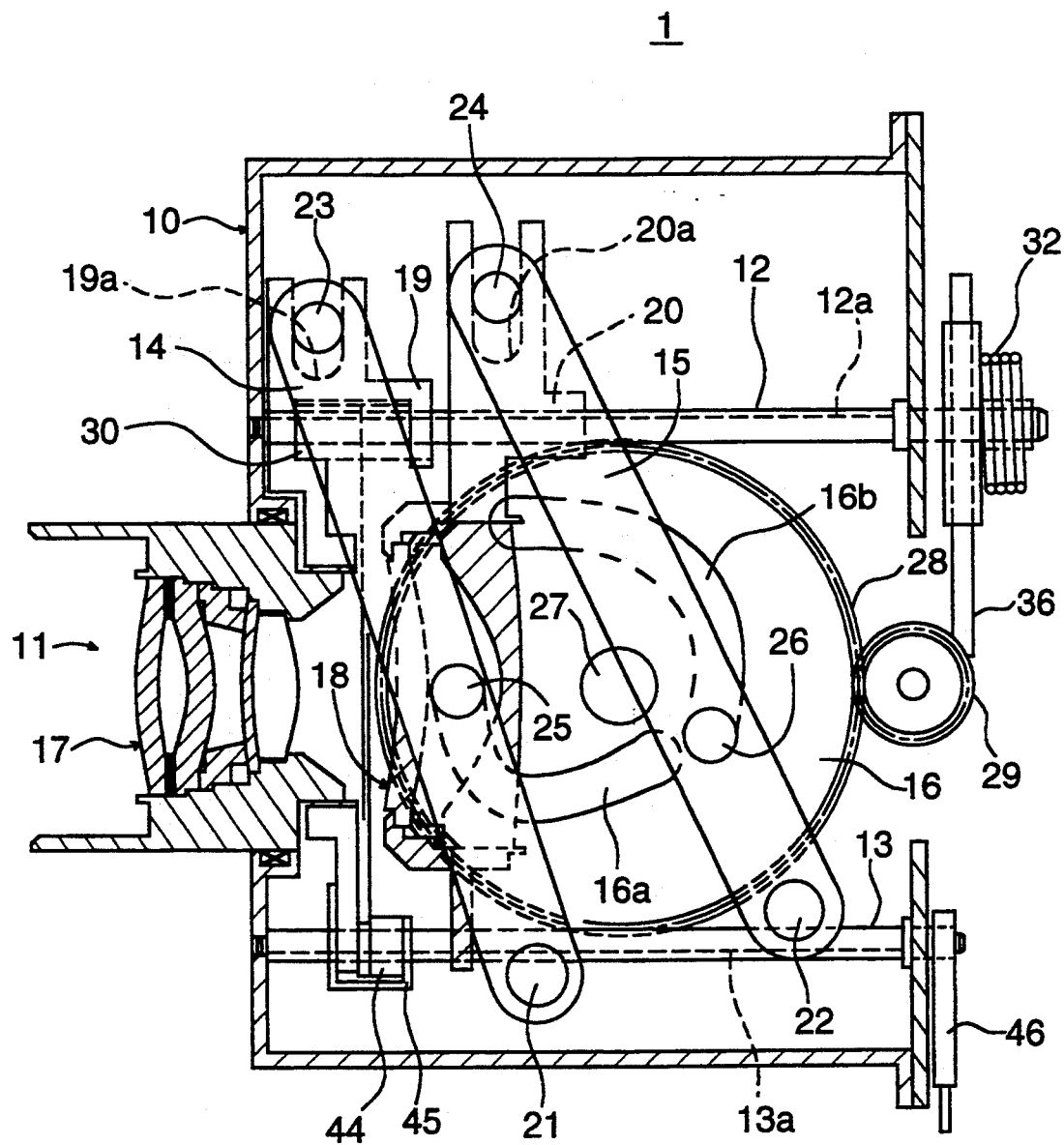
FIG. 3 is a plan view of the zoom lens barrel in the case of a long focal distance according to an example of the present invention.
Figure 4:
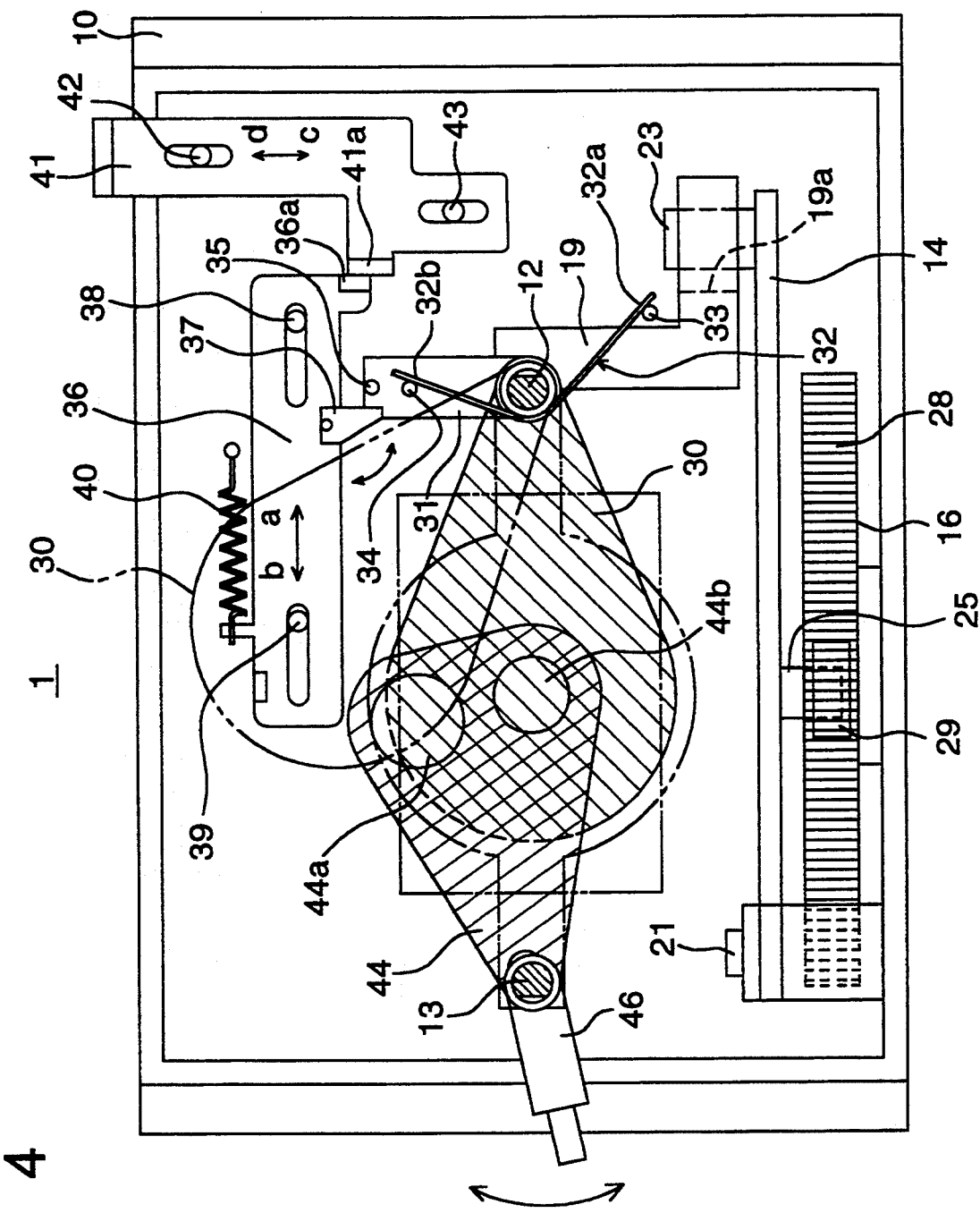
FIG. 4 is a side view projected from the right side of the zoom lens barrel shown in FIG. 1 (the rear surface of the barrel).
Figure 5:
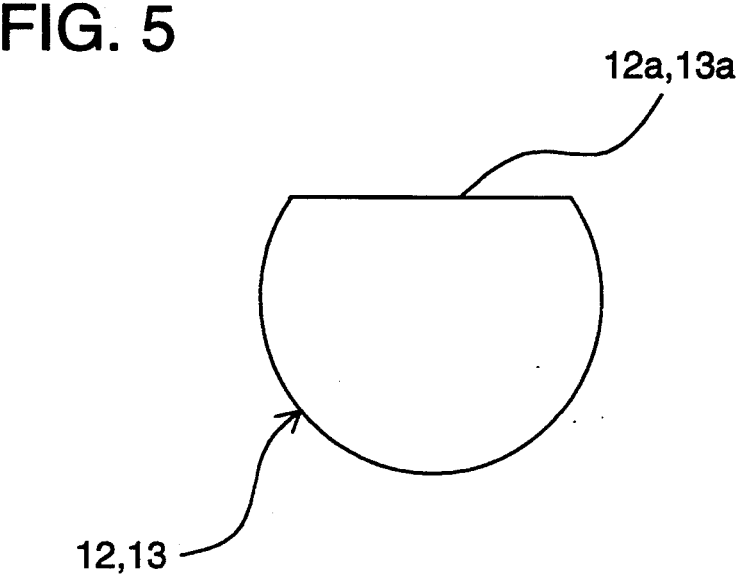
FIG. 5 is a sectional view of a guide shaft in an example of the present invention.
Figure 6:
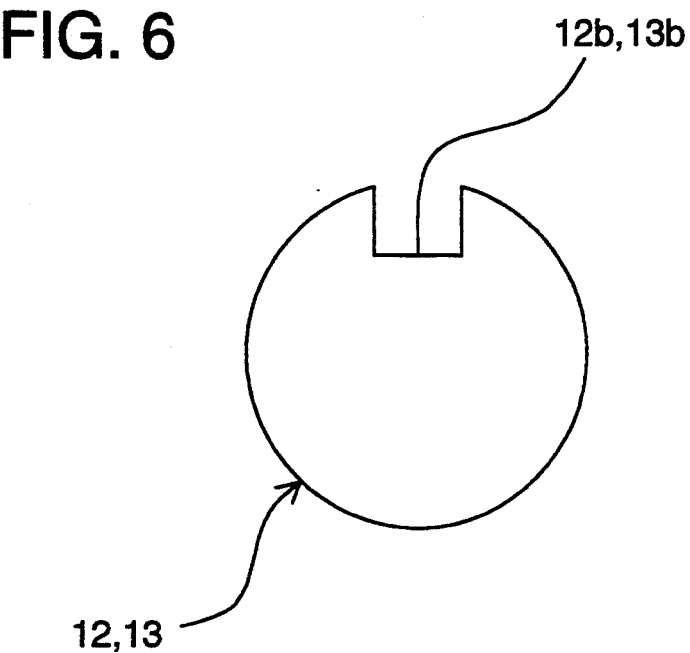
FIG. 6 is a sectional view of the guide shaft of another example.

FIG. 2 is a plan view showing the zoom lens in the case of a short focal distance, FIG. 3 is a plan view of the zoom lens barrel in the case of a long focal distance, FIG. 4 is a side view of the zoom lens barrel projected from the right side in FIG. 1 (the rear surface of the lens barrel), and FIG. 5 is a sectional view Of the guide shaft. The shape of a casing 10 of the zoom lens barrel 1 is generally a box type, and a lens 11, two guide shafts 12, 13 which are in parallel with the optical axis of lens 11, a front arm member 14, a rear arm member 15, a disk cam 16 and the like are provided in the casing 10.

The lens 11 is composed of a front lens group 17 and a rear lens group 18, and they form a zoom lens system in which they are relatively moved. A front lens group frame 19 by which the front lens group 17 is held, and a rear lens group frame 20 by which the rear lens group 18 is held, are slidably supported by guide shafts 12 and 13.

The front arm member 14 and the rear arm member 15 are rotatably supported by fulcrums in the casing 10 in the manner that the front arm 14 is rotated around a fulcrum 21, and the rear arm 15 is rotated around a fulcrum 22 in the direction parallel to the optical axis. A driving pin 23 is provided on a rotating end of the arm member 14, and a driving pin 24 is provided on a rotating end of the arm member 15. The driving pin 23 is engaged with a groove portion 19a of the front lens group frame 19, and the driving pin 24 is engaged with a groove portion 20a of the rear lens group frame 20. The width of the groove portion 19a and that of the groove portion 20a are respectively the same as the diameter of the driving pin 23 and that of the driving pin 24. The driving pins 23 and 24 can be moved respectively in grooves 19a and 20a in the direction perpendicular to the moving direction of the lens 11.

Engagement pins 25 and 26, which are formed as disk cams and engaged with cam grooves 16a and 16b respectively, are provided respectively on middle portions of the front arm member 14 and the rear arm member 15. The disk cam 16 which is rotated around a rotating shaft 27, is provided in the casing 10, and a gear 28 formed around the periphery of the disk cam 16 is engaged with a driving gear 29. The driving gear 29 is connected with a motor, not shown in the drawing, and is rotated clockwise or counterclockwise arbitrarily.

Next, the operation of the zoom lens barrel will be described as follows. The driving gear 29 is rotated by the motor; thereby the disk cam 16 is rotated counterclockwise; engagement pins 25 and 26 are slidingly moved respectively in the cam groove portion 16a and 16b; and the front arm member 14 and the rear arm member 15 are rotated respectively along the shape of the cam groove portion 16a and that of the cam groove portion 16b to the left side in the drawing. Then, since the driving pin 23 and the driving pin 24 are respectively engaged with the groove portion 19a and the groove portion 20a, the front lens group 17 and the rear lens group 18 of the lens 11 are moved forwards along the guide shafts 12, 13 by the front and rear arm members 14 and 15. From the foregoing, the zoom lens barrel is in the condition of a long focal distance. When the lens 11 is moved, since the length from the fulcrum 21 to the driving pin 23 is longer than that from the fulcrum 21 to the engagement pin 25, and the length from the fulcrum 22 to the driving pin 24 is longer than that from the fulcrum 22 to the engagement pin 26, the movement amount of the engagement pin 25 and that of the engagement pin 26 are respectively enlarged corresponding to the ratios of the length from the fulcrums to the driving pins, to the length from the fulcrums to the engagement pins, and the front lens group 17 and the rear lens group 18 are independently moved corresponding to the enlarged movement amounts of cam groove portions 16a and 16b.

Accordingly, the front lens group 17 and the rear lens group 18 can be largely moved respectively by a small size disk cam 16 along guide shafts 12 and 13, and further, when the motor is reversely moved, the disk cam is reversely rotated, thereby the front lens group 17 and the rear lens group 18 can be moved backwards.

The guide shafts 12 and 13 can be used as guides by which the front lens group 17 and rear lens group 18 are accurately moved slidingly in parallel with the optical shaft. The guide shafts 12 and 13 have respectively a sectional form in which a portion of a circle is cut out, and by which each of cam portions 12a and 13a is formed. Shutter blades 30 as an exposure control member can be moved in the direction of the optical axis with respect to the guide shaft 12, and integrally rotated with the guide shaft 12. The shutter blades 30 are provided under the condition that they are sandwiched in the front lens group frames 19.

A shutter base 31 is fixed to the end of the guide shaft 12 and can be integrally rotated with the guide shaft 12. One end 32a of a coil spring 32 wound around the guide shaft 12 is hooked to a fixed pin 33 provided in the casing 10, and the other end 32b of the coil spring 32 is hooked to a hook pin 34 fixed to the shutter base 31. The coil spring 32 always urges the shutter base 31 so that the shutter blade 30 is closed by the shutter base 31 through the guide shaft 12. An operational pin 35 is provided on the shutter base 31, and the operational pin 35 is pushed by an operational claw 37 provided on a shutter operation member 36 when the shutter operation member 36 is moved in arrowed direction a.

A shutter operation member 36 is movably guided in the arrowed directions a or b by supporting pins 38 and 39 provided in the casing 10. The shutter operation member 36 is always urged by a spring 40 in the arrowed direction a, and a stopper 36a provided on the shutter operation member 36 comes into contact with a stopper 41a of the shutter button 41. The shutter button 41 is movably guided in the arrowed direction c or d by supporting pins 42 and 43 provided in the casing 10.

The guide shaft 13 performs the function to prevent the rotation of both the front lens group 17 and the rear lens group 18 around the guide shaft 12. A diaphragm 44 as an exposure control member can be moved in the direction of the optical shaft with respect to the guide shaft 13, and integrally rotated with the guide shaft 13. The diaphragm 44 is provided in the front lens group frame 19 by a mounting member 45. A diaphragm conversion arm 46 which is integrally rotatable with the guide shaft 13 is provided on the end of the guide shaft 13, and diaphragm windows 44a, 44b which are opened on the diaphragm 44, the sizes of which are different to each other, are switched when the diaphragm conversion arm 46 is moved.

Next, a shutter operation of the zoom lens barrel will be described as follows. A shutter operation member 36 can be moved in arrowed directions a or b in FIG. 4. In the drawing, the shutter operation member 36 is moved to the right side by a spring 40, and a stopper 36a provided to the shutter operation member 36 comes into contact with a stopper 41a of a shutter button 41, and is held for shutter-charging.

When the shutter button 41 is pushed to the arrowed direction c under the condition that the shutter is charged, the stopper 36a of the shutter operation member 36 is separated from the stopper 41a, and the shutter operation member 36 is moved at high speed in the arrowed direction a by the spring 40. An operational claw 37 is provided to the shutter operation member 36, and the operational claw 37 kicks the operational pin 35 of the shutter base 31 at the time of high speed movement. Due to the foregoing, the shutter base 31 and the shutter blade 30, which is integrally rotated with the shutter base 31, are rotated clockwise around the guide shaft 12, and then, the shutter is opened. When the shutter blade 30 is opened, the shutter blade 30 is forced by the coil spring 32 to return to the initial position. That is, the shutter speed depends on the spring force of the spring 40 and the coil spring 32. When the shutter blade is operated, since the position of the lens 11 is determined by the circular portion of the sectional form of the guide shaft 12, the lens 11 is held in the same position irrespective of the shutter operation.

Next, a diaphragm operation of the zoom lens barrel will be described as follows. The diaphragm conversion arm 46 is connected with a strobe ON/OFF switch provided in the camera, and the diaphragm 44 is integrally rotated around the guide shaft 13 by the diaphragm conversion arm 46. As described above, when the diaphragm conversion arm 46 is moved, a large diaphragm window 44a provided on the diaphragm 44 is switched to a small diaphragm window 44b. The large diaphragm window 44a is used for strobe photography, and the small diaphragm window 44b is used for ordinary photography. Although the guide shaft 13 is rotated by the diaphragm conversion operation, the rotation of the lens 11 is stopped by the circular portion of the sectional form of the guide shaft 13, and therefore the lens 11 is held at the same position irrespective of the diaphragm conversion operation.

With respect to the guide shafts 12 and 13, the cam portions 12a and 13a are formed when one side of a cylinder is cut away to form a flat surface, that is, a so-called D-section, and therefore, the cost for processing the parts is low. Further, with respect to the guide shafts 12 and 13, rectangular slots 12b and 13b may be formed on one end portion of a cylinder, and in this case, the shutter and diaphragm operations can be more exactly carried out.

The shutter blade 30 and the diaphragm 44 integrally provided with the front lens group frame 19, are moved to the left by the guide shafts 12 and 13 at the time of the long focal distance. The operational force for the shutter blade 30 and the diaphragm 44 are transmitted by the guide shafts 12 and 13, and therefore, the operational reliability can not be affected at any focal distance. The guide shaft 12 has two functions by which straight advancing of the lens is regulated and the operational force for the shutter blade 30 is transmitted, and therefore the numbers of parts can be reduced. Similarly, the guide shaft 13 has two functions by which straight advancing of the lens is regulated and the operational force for the diaphragm 44 is transmitted, and therefore, the numbers of parts can be reduced.

Figure 7:
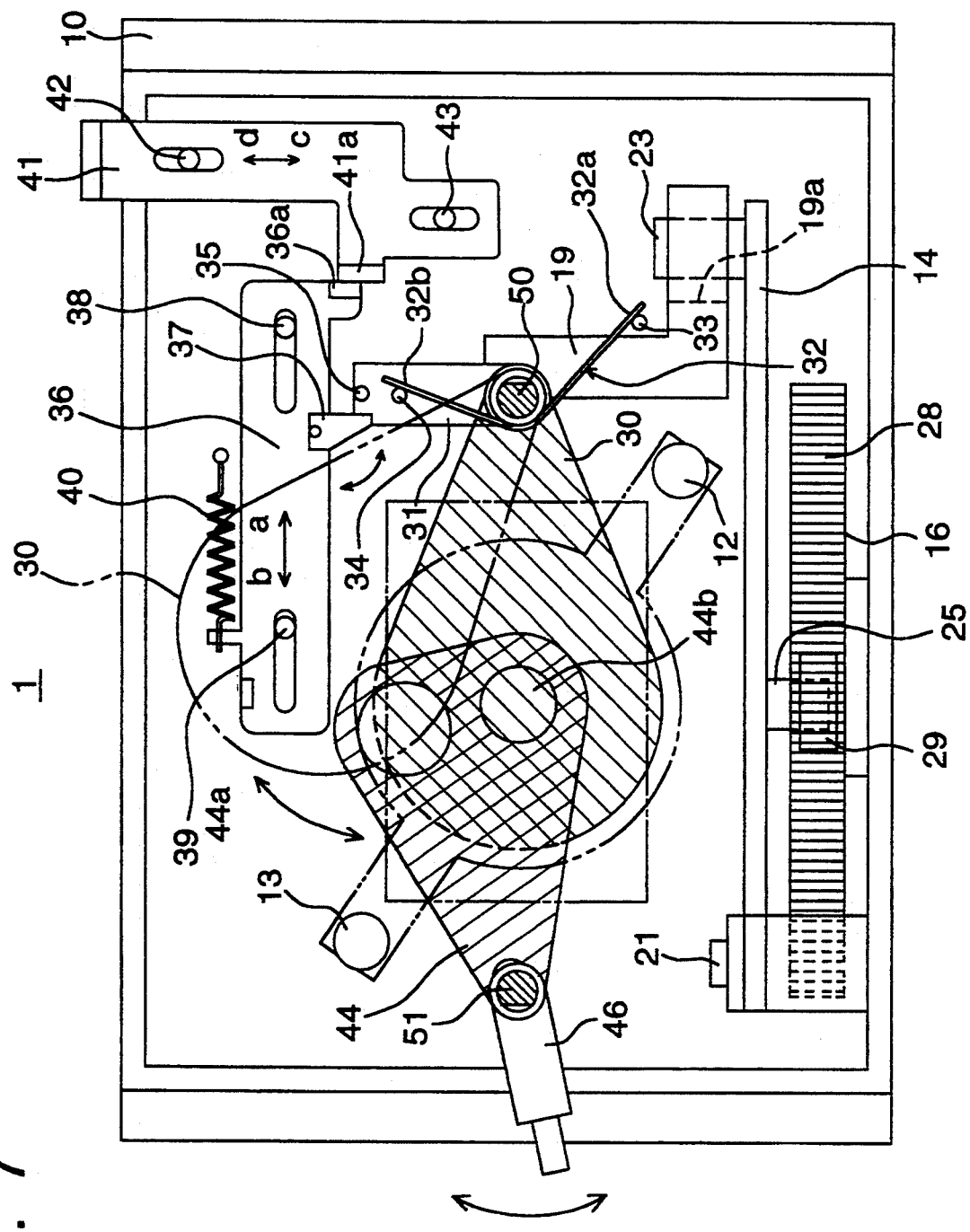
FIG. 7 is a side view of the zoom lens barrel in another example of the present invention.

FIG. 7 is a side view of another example of the zoom lens barrel. In this example, the guide shafts 12 and 13 are supported by the casing 10 of the main body, and straight advancing of the lens 11 in the direction of the optical axis can be accurately carried out by the guide shafts 12 and 13. Operational shafts 50 and 51 are provided in parallel with the guide shafts 12 and 13. The shutter member 30 is provided to the operational shaft 50, and the diaphragm 44 is provided to the operational shaft 51 in the manner that the exposure control member (the shutter member 30 and the diaphragm 44) can be integrally rotated with the operational shafts and can be moved in the axial direction, and the exposure control member can be operated when the operational shafts 50 and 51 are rotated, in the same way as the foregoing example.

In the zoom lens barrel of the foregoing example, the lens frame is slidably supported by the guide shafts provided in the barrel main body, and the straight movement of the lens frame in the direction of the optical axis is regulated by the guide shafts. Further, when the exposure control member is provided to the guide shafts in the manner that the exposure control member can be integrally rotated with the guide shafts and can be moved in the axial direction, the exposure control member can be operated with the rotation of the guide shafts. Therefore, in the zoom lens which is moved in the direction of the optical axis, a highly reliable operation can be carried out, and a low cost zoom lens barrel, the number of parts of which is small, can be obtained.

Further, in the zoom lens barrel, the lens frame is slidably supported by the guide shafts provided in the barrel main body, and the straight movement of the lens frame in the direction of the optical axis is regulated by the guide shafts. When operational shafts are provided in parallel with the guide shafts, and the exposure control member is provided to the operational shafts in the manner that the exposure control member can be integrally rotated with the guide shafts, and can be moved in the axial direction, the exposure control member can be operated by the rotation of the operational shafts. Therefore, in the zoom lens which is moved in the direction of the optical axis, a highly reliable operation can be carried out, and a low cost zoom lens barrel, the number of parts of which is small, can be obtained.

The exposure control member (the shutter or diaphragm,) can be operated by the rotation of the guide shafts or operational shafts. Therefore, the structure of the shutter and the diaphragm is simple.

Figure 8:
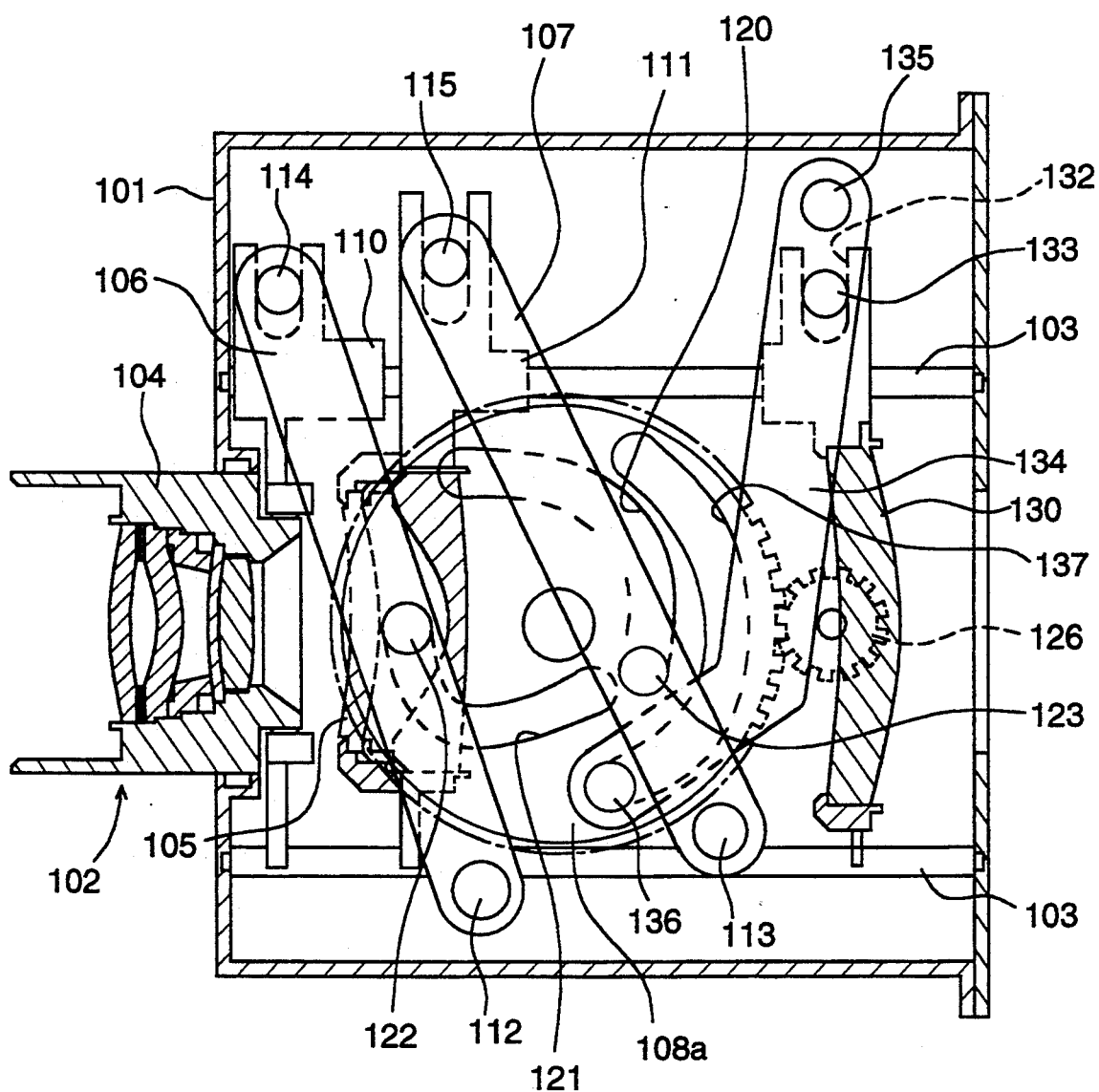
FIG. 8 is a plan view showing a structure to drive an aberration compensating lens provided in the zoom lens barrel of an example of the present invention.

FIG. 8 is a plan view showing an example of the zoom lens barrel in which an aberration compensation lens is provided in the rear portion of the barrel.

The aberration compensation lens 130 is provided in addition to the rear portion of the foregoing zoom lens barrel, and the structure of the zoom lens barrel excluding the compensation lens is the same as that of the foregoing example, and the symbols are the same as those in the foregoing.

The aberration compensation lens 130 is provided to the guide shaft 103 in the manner that it can be moved along the guide shaft 103. A driving pin 133 for an arm member 134, which will be described later, is engaged with a groove 132 formed in a lens sliding frame 131. The arm member 134 is rotatably supported by a fulcrum 135, and an engagement pin 136 formed on the tip of the arm member is slidably engaged with a cam groove 137 for the aberration compensation formed in a disk cam 108a.

Accordingly, in the case of the arm member 134, since the distance from the fulcrum 132 to the driving pin 133 is shorter than the distance from the fulcrum 132 to the engagement pin 136, the movement amount of the engagement pin 136 can be reduced. When, therefore, the focal distance of the lens 102 is switched from the short focal distance to the long focal distance by the rotation of the disk cam 108a, the driving pin 133 can be minutely moved, molding errors of the cam groove 137 can be reduced, and thereby, the aberration compensation can be accurately carried out.

Further, when a gear ratio of the disk cam to the driving gear is high, a high reduction ratio can be obtained. Therefore, even when another reduction device is not provided, the lens 102 can be accurately operated, the size of the zoom lens barrel can be made small, and the number of parts can be reduced.

Figure 9:
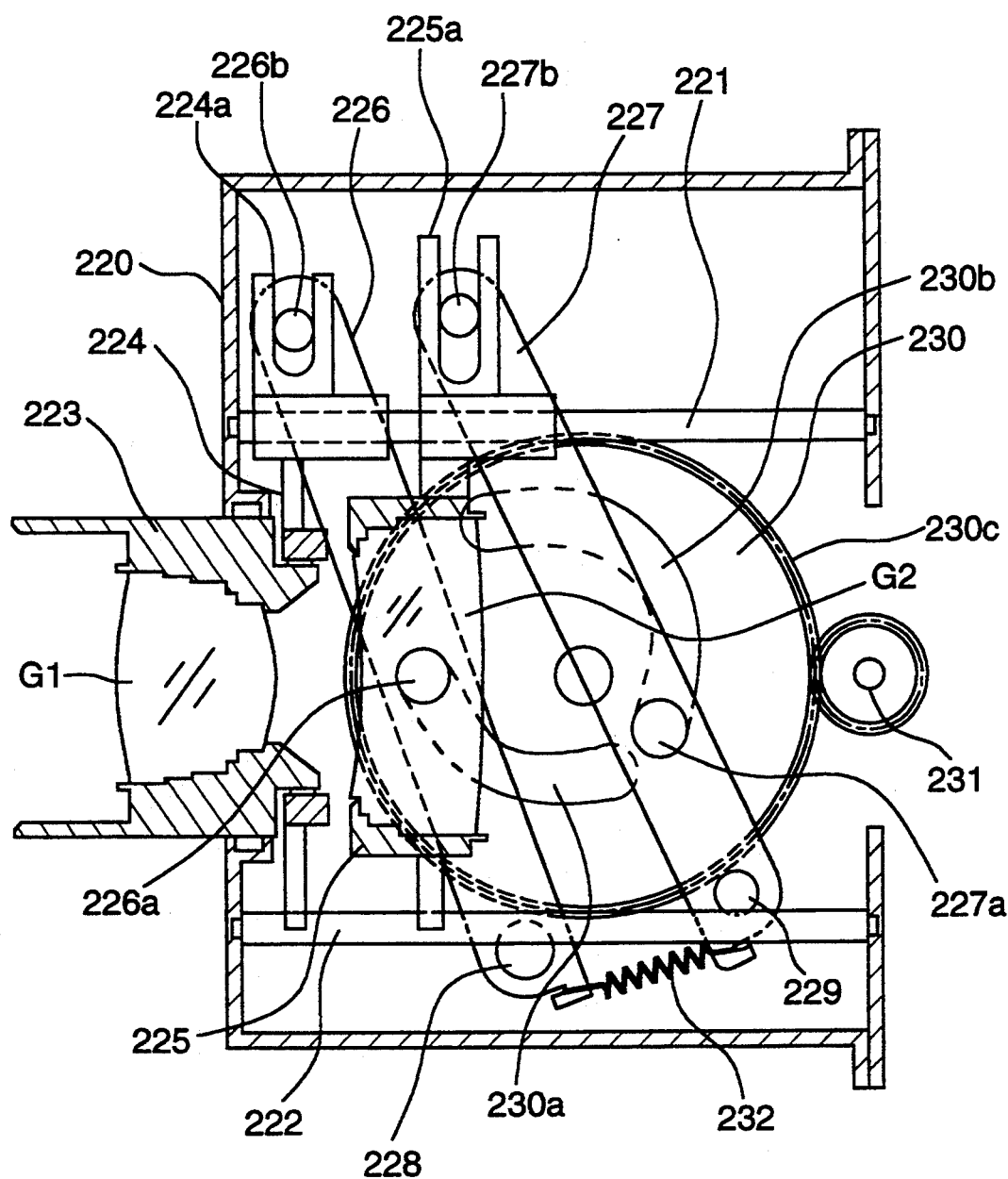
FIG. 9 is a view showing a general structure of the zoom lens barrel in the case of a long focal distance in an example of the present invention.
Figure 10:
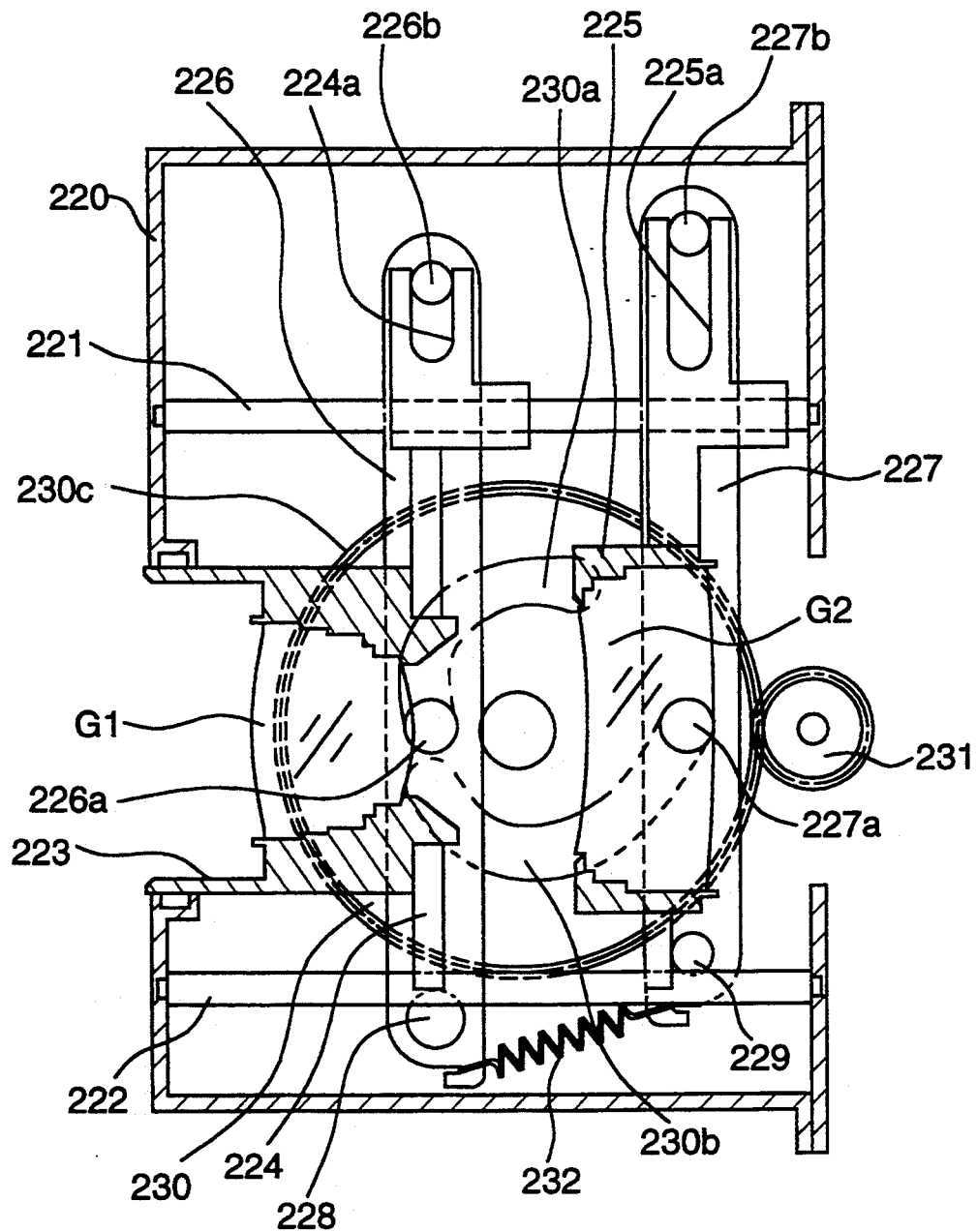
FIG. 10 is a view showing a general structure of the zoom lens barrel in the case of a short focal distance in an example of the present invention.

Referring to FIG. 9 and FIG. 10, an example by which the second object of the present invention can be accomplished, will be described as follows.

FIG. 9 and FIG. 10 are views showing the general structure of the zoom lens barrel of the present invention, in which the lens is respectively in the long focal distance and short focal distance. In the drawings, numeral 220 is a main body casing, numerals 221 and 222 are guide bars fixed in the casing 220 in parallel with the optical axis, and numeral 223 is a lens frame holding the front lens group G1. Numeral 224 is a front lens group zoom frame which is helicoidally screwed on the lens frame 223 at the inner circular portion, and slidably engaged with guide bars 221 and 222 at an arm portion extending outwardly from the inner circular portion. Accordingly, the front lens group G1 can be operated to focus on the photographing distance when the lens frame 223 is moved forwardly or backwardly in the direction of the optical axis with respect to the front lens group zoom frame 224 by a helicoidal screwing operation. In FIG. 10, the condition of helicoidal screwing of the front lens group zoom frame 224 on the lens frame 223 is omitted.

A lever 226 is connected with a lever 227 by a spring 232, at positions which are slightly apart from fulcrum shafts 228 and 229 respectively. In the example shown in the drawing, the lever 226 is urged counterclockwise and the lever 227 is urged clockwise. Then, a cam pin 226a is engaged with a cam groove 230a on one surface of the cam groove, and also a cam pin 227a is engaged with a cam groove 230b on one surface of the cam groove. Accordingly, errors or fluctuations of the zooming position caused by the engagement clearance between the cam pin and the cam groove can be eliminated. Further, even when levers 226 and 227 are swung for zooming, the change of the working length of the spring 232 is small, and therefore, the change of the driving force for zooming is small. Needless to say, the direction of the urging force for rotation applied to the levers 226 and 227 can be changed from the clockwise direction to the counterclockwise direction corresponding to the connecting positions of the spring 232 with the levers, that is, at the side of the cam pins 226a and 227a with respect to the fulcrum shafts 228 and 229, or at the opposed side to that.

Applying pins 226b and 227b are provided at the positions respectively apart from the fulcrum shaft 228 of the lever 226 and the fulcrum shaft 229 of the lever of the lever 227. The applying pins 226b and 227b are slidably engaged with sliding slots 224a and 225a provided across the the optical shaft respectively, wherein the sliding slots 224a and 225a are provided in the front lens group zoom frame 224 and the lens frame 225 respectively. Accordingly, when the levers 226 and 226 are swung by zooming, the front lens group zoom frame 224 and the lens frame 225 are moved in the direction of the optical axis. The engagement of the applying pins 226b and 227b with sliding slots 224a and 225a is different from that of cam pins with cam grooves, and the shape of the sliding slot is linear. Therefore, the engagement clearance can be easily reduced, and thereby errors and fluctuation of movement for zooming can be reduced. The applying pins 226b and 227b do not apply force on the front lens group zoom frame 224 and the lens frame 225, and therefore there is no possibility that the front lens group G1 and the rear lens group G2 are tilted, and thereby, movement for zooming can be smoothly carried out without any twisting.

In the present example, the applying pins 226b and 227b are provided at positions in which movement amounts of cam pins 226a and 227a in the optical axis direction with respect to the cam grooves 230a and 230b are maximum in order to obtain the appropriate movement amount for zooming of the front lens group zoom frame 224 and the lens frame 225. When the applying pins 226b and 227b are provided close to the cam pins 226a and 227a, the movement amount for zooming of the front lens group zoom frame 224 and the lens frame 225 is close to the movement amount given by the cam groove. When the applying pins 226b and 227b are provided at positions close to the fulcrum shafts 228 and 229 with respect to the cam pins 226a and 227a, the movement amount for zooming becomes smaller than the movement amount given by the cam groove. That is, the movement amount by the cam in the direction of the optical axis is enlarged or reduced arbitrarily in order to obtain the appropriate movement amount for zooming.

Next, referring to FIG. 9 to FIG. 22, an example to accomplish the third object of the present invention will be described as follows.

In the example, a front lens group zoom frame 304 and a rear lens group zoom frame 305 are moved for zooming in the direction of the optical axis. The condition of movement for zooming shown in FIG. 11, FIG. 13 and FIG. 15 is the condition of a long focal distance, that is, the telephoto lens condition, and the condition of movement for zooming shown in FIG. 12, FIG. 14, FIG. 17, FIG. 18 and FIG. 19 is the condition of a short focal distance, that is, the wide-angle lens condition.

Figure 11:
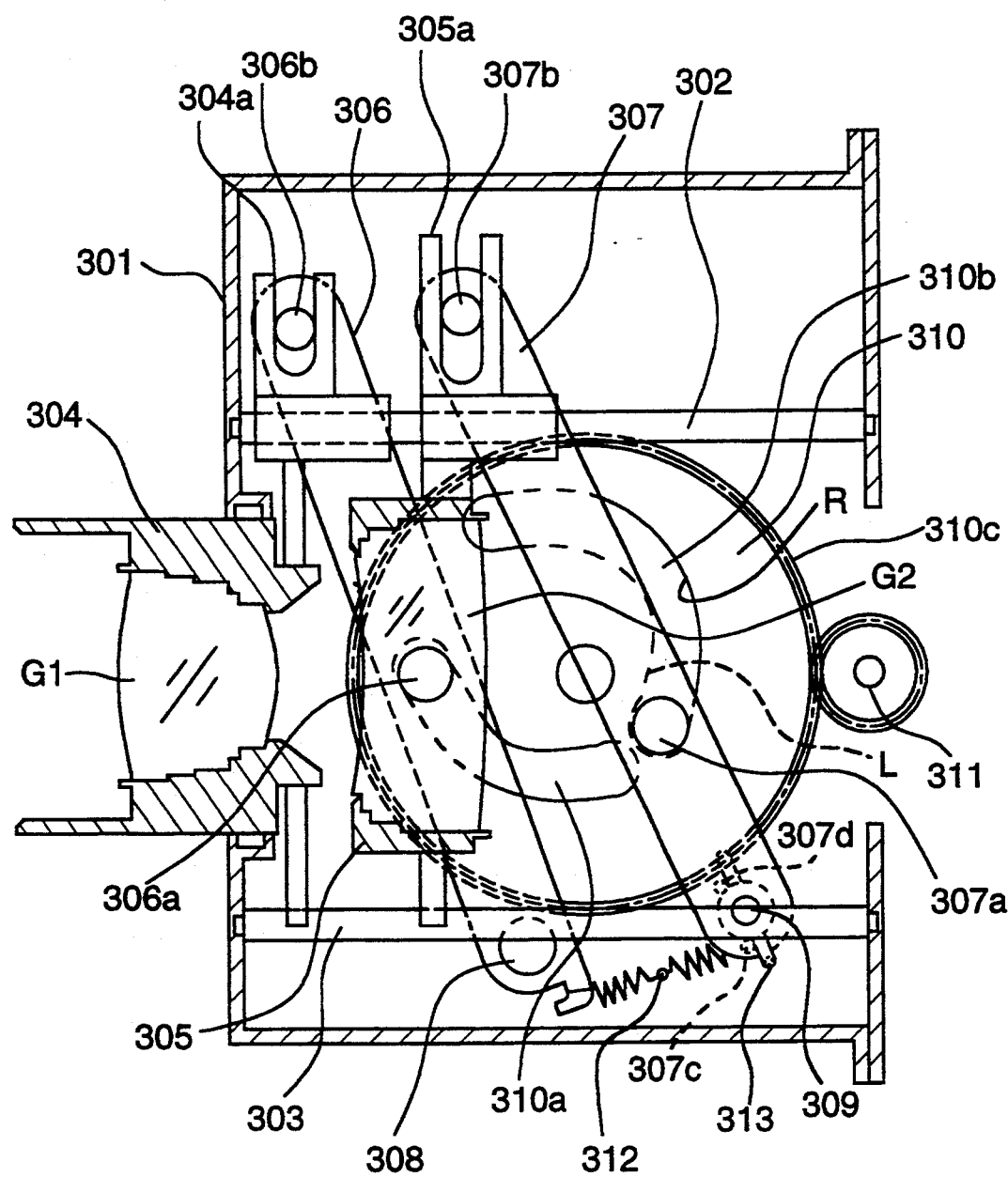
FIG. 11 is a view showing a general structure of the zoom lens barrel in an example of the present invention.
Figure 12:
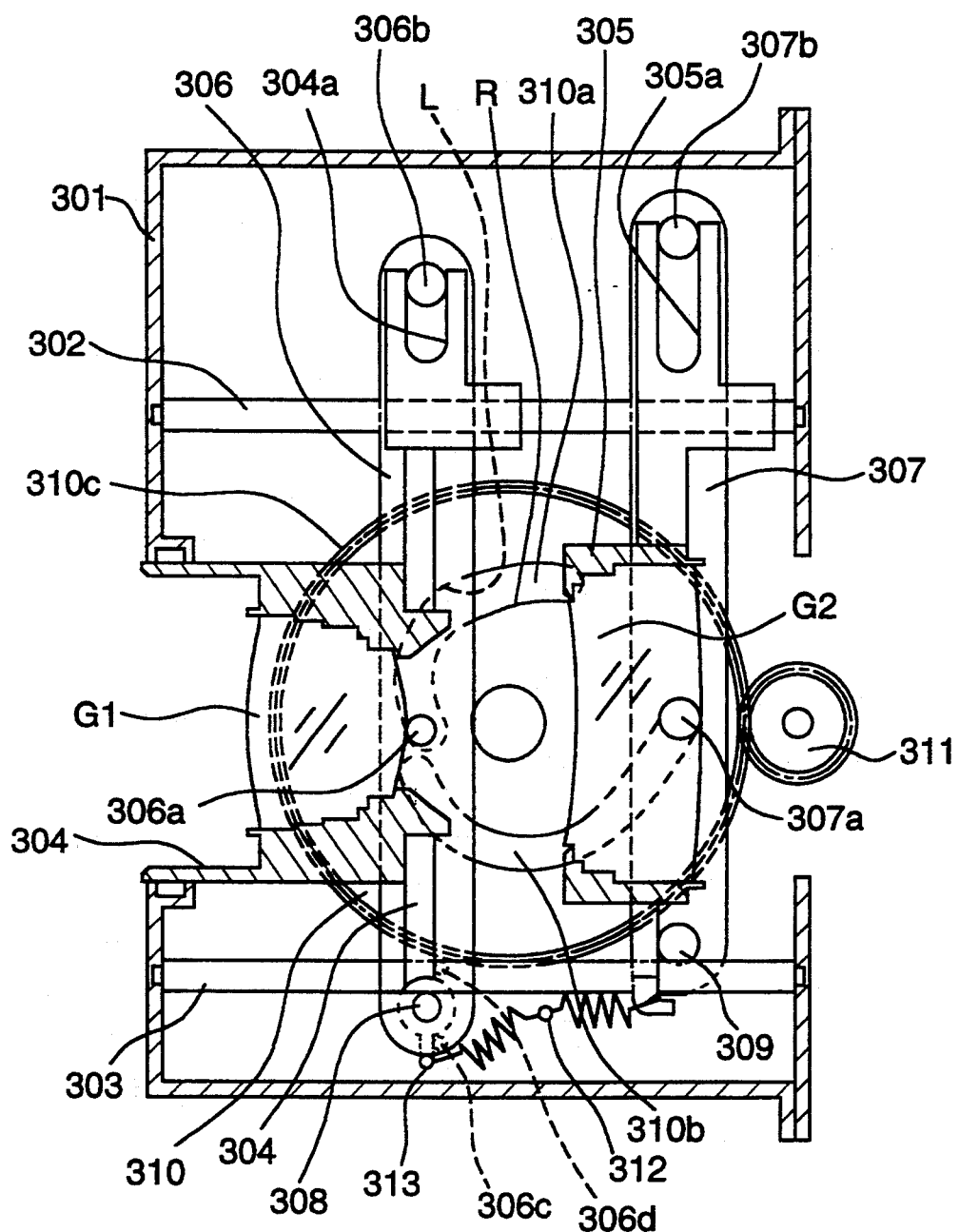
FIG. 12 is a view showing a general structure of the zoom lens barrel in an example of the present invention.
Figure 13:
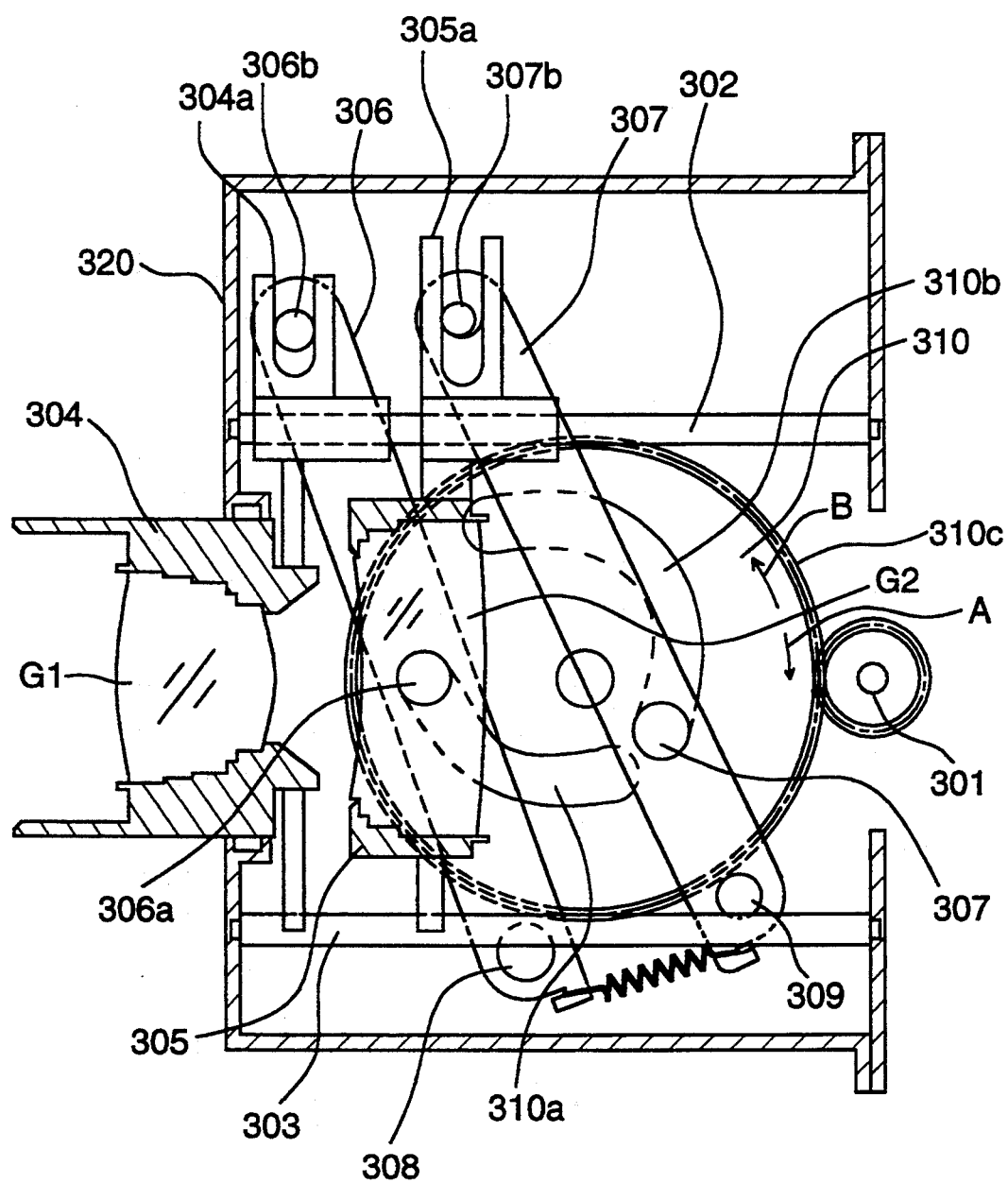
FIG. 13 is a view showing a general structure of the zoom lens barrel in an example of the present invention.

Numeral 312 shown in FIG. 11 and FIG. 12 is a spring hook pin provided in a main body frame 301. In the example shown in FIG. 11, a tension spring is hooked at the position slightly apart from a fulcrum shaft 308 of a lever 306, and the spring hook pin 312. In the example shown in FIG. 12, a tension spring is hooked at the position slightly apart from a fulcrum shaft 309 of a lever 307, and at the spring hook pin 312. They give the urging force for rotation to the lever 306 and the lever 307 respectively to rotate around fulcrum shafts 308 and 309 in one direction, and thereby, backlash is not caused in the engagement of a cam pin 306a of the lever 306 with a front lens group cam groove 310a, and engagement of a cam pin 307a of the lever 307 with a rear lens group cam groove 310b.

A distance changing lever 313 having the spring hook pin on an end portion is supported by a fulcrum shaft 309 of the lever 307 in the example shown in FIG. 11, or by a fulcrum shaft 308 of the lever 306 in the example shown in FIG. 12 in the manner that the distance changing lever 313 can be rotated under the condition that it is stopped by a stopper 307c or 307d provided to the lever 507, or by a stopper 306c or 306d provided to the lever 306. A tension spring is hooked at the spring hook pin provided to the distance changing lever 313 and at the foregoing spring hook pin 312.

FIG. 11 shows a short distance focusing condition in which the distance changing lever 313 comes into contact with the stopper 307c provided to the lever 307 so that the clockwise urging force for rotation is given to the lever 307, and therefore, the cam pin 307a always comes into contact with a right side surface R of the rear lens group cam groove 310b. Then, when the distance changing lever 313 is switched to come into contact with a stopper. 307d by counterclockwise rotation, the counterclockwise urging force for rotation is given to the lever 307, and thereby, an ordinary photographic distance focusing condition, in which the cam pin 307a always comes into contact with the left side surface L of the rear lens group cam groove 306, is obtained. That is, FIG. 11 shows an example in which: the position of the front lens group G1 in the optical axis direction is not changed; the position of the rear lens group G2 in the optical axis direction is moved forward or backward corresponding to a gap between the cam groove and the cam pin; and thereby, the lens position is switched to the ordinary photographic distance focusing condition or the short distance focusing condition.

FIG. 12 shows the short distance focusing condition in which: the distance changing lever 313 comes into contact with the stopper 306c of the lever 306 so that the counterclockwise urging force for rotation is given to the lever 306; and thereby, the cam pin 306a always comes into contact with the left side surface of the front lens group cam groove 310a. Then, when the distance changing lever 313 is switched to come into contact with a stopper 306d by the clockwise rotation, the clockwise urging force for rotation is given to the lever 306, and thereby, an ordinary photographic distance focusing condition, in which the cam pin 306a always comes into contact with the right side surface R of the front lens group cam groove 310a, is obtained. That is, FIG. 12 shows an example in which: the position of the rear lens group G2 in the optical axis direction is not changed; the position of the front lens group G1 in the optical axis direction is moved forward or backward corresponding to a gap between the cam groove and the cam pin; and thereby, the lens position is switched to the ordinary photographic distance focusing condition or the short distance focusing condition.

Figure 14:
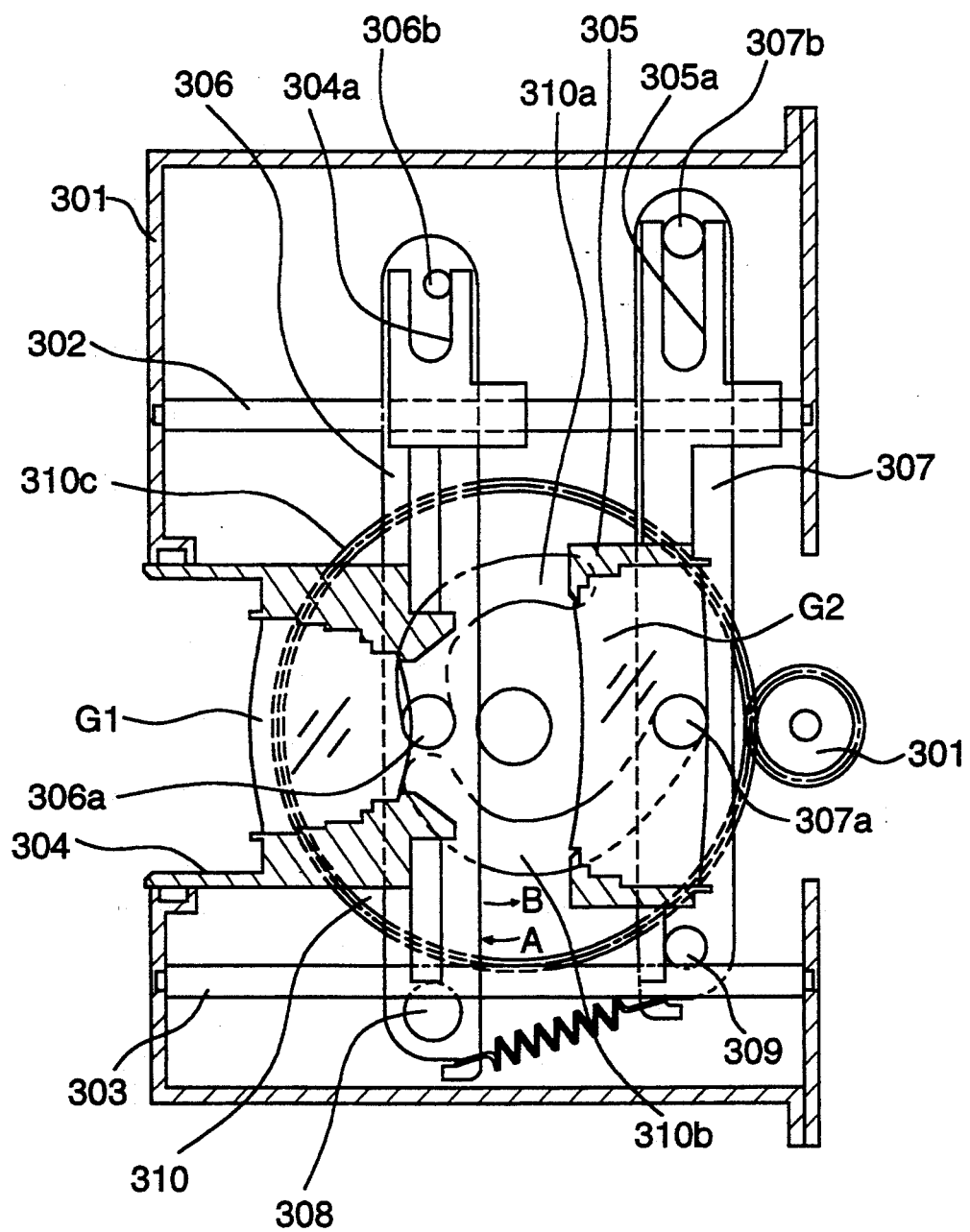
FIG. 14 is a view showing a general structure of the zoom lens barrel in an example of the present invention.
Figure 15:
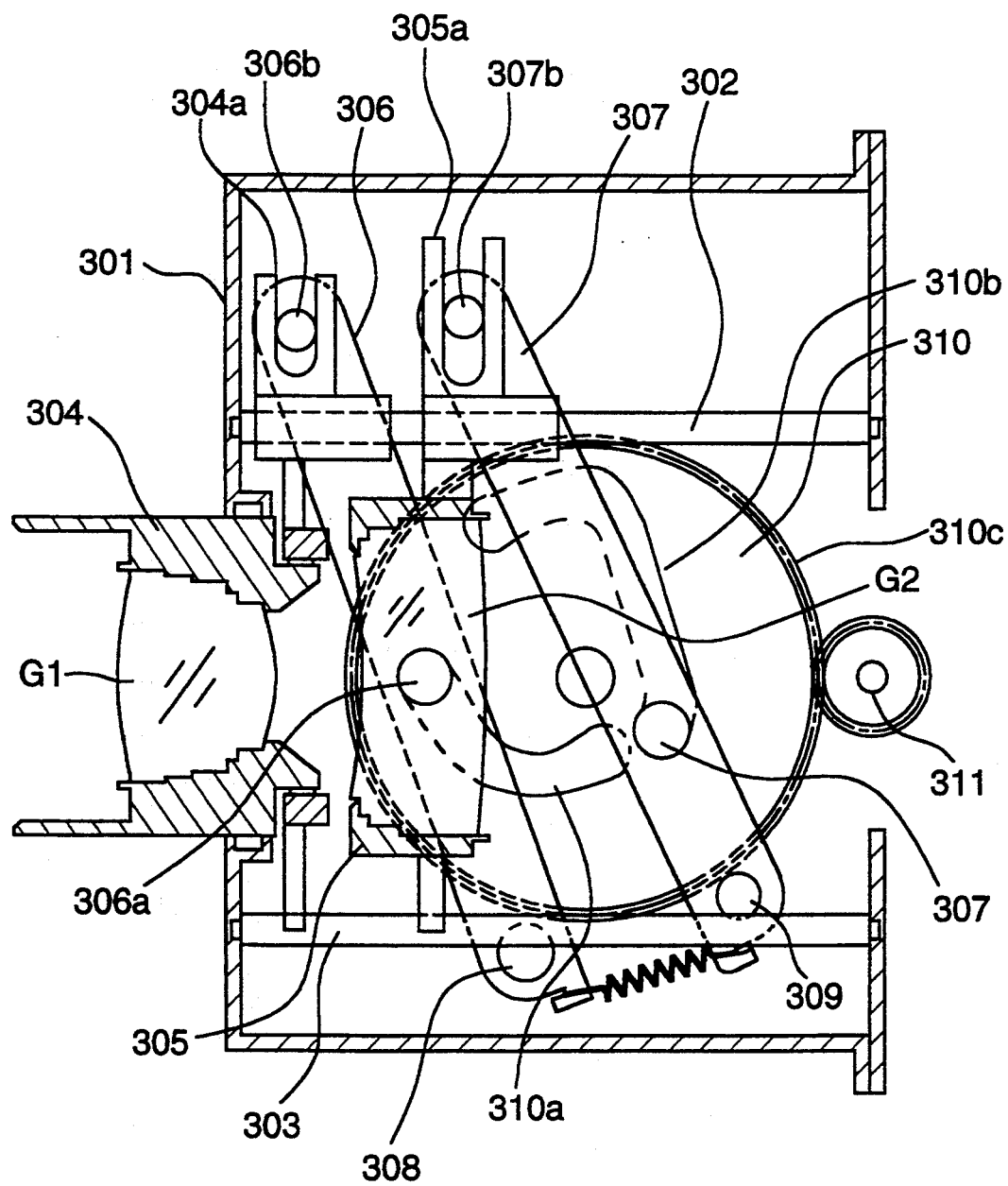
FIG. 15 is a view showing a general structure of a stepwise variable focus lens barrel in an example of the present invention.

FIGS. 13 and 14 show an example in which: two positions, which are slightly apart from fulcrum shafts 308 and 309 of the levers 306 and 307, are directly connected with a tension spring so that the one direction urging force for rotation is applied on the levers; and thereby, backlash is not caused in engagement of the cam pin 306a with the front lens group cam groove 310a, and engagement of the cam pin 307a with the rear lens group cam groove 310b. In the example shown in FIG. 13, a gap is given in the engagement of a applying pin 307b of the lever 307 with a sliding groove 305a of the rear lens group zooming frame 305, and in the example shown in FIG. 14, a gap is given in the engagement of a applying pin 306b of the lever 306 with a sliding groove 304a of a front lens group zooming frame 304.

FIG. 13 shows a short distance focusing condition in which: a cam disk 310 is rotated counterclockwise in the arrowed direction B; the front lens group zooming frame 304 and the rear lens group zooming frame 305 are moved from right to left by the levers 306 and 307, and stopped at the telephoto lens end. When the cam disk 310 is rotated clockwise in the arrowed direction A from the foregoing condition, the rear lens group zooming frame 305 is not moved until the applying pin 307b, which is in contact with the left side surface of the sliding groove 305a, comes into contact with the right side surface of the sliding groove 305a, and only the front lens group zooming frame 304 is moved to the right in the optical axis direction. Then, when the applying pin 307b comes into contact with the right side surface of the sliding groove 305a, the ordinary photographic distance focusing condition at the telephoto lens end is obtained. Further, when the cam disk 310 continues rotation in the arrowed direction A, the zooming frame 304 arrives at the wide-angle lens end keeping the ordinary photographic distance focusing condition. When the cam disk 310 is rotated from the wide-angle lens end in the arrowed direction B, the rear lens group zooming frame 305 is not moved until the applying pin 307b which is in contact with the right side surface of the sliding groove 305a, comes into contact with the left side surface of the sliding groove 305a, and only the front lens group zooming frame 304 is moved to the left in the optical axis direction. Then, when the applying pin 307b comes into contact with the left side surface of the sliding groove 305a, the short distance focusing condition at the wide-angle lens end is obtained. Further, when the cam disk 310 continues rotation in the arrowed direction B, the zooming frame 304 arrives at the telephoto lens end keeping the short distance focusing condition.

FIG. 14 shows a short distance focusing condition in which: a cam disk 310 is rotated clockwise in the arrowed direction A; and the front lens group zooming frame 304 and the rear lens group zooming frame 305 are moved from left to right by the levers 306 and 307, and stopped at a wide-angle end. When the cam disk 310 is rotated counterclockwise in the arrowed direction B from the foregoing condition, the front lens group zooming frame 304 is not moved until the applying pin 306b, which is in contact with the right side surface of the sliding groove 304a, comes into contact with the left side surface of the sliding groove 304a, and only the rear lens group zooming frame 305 is moved from the right in the optical axis direction to the left. Then, when the applying pin 306b comes into contact with the left side surface of the sliding groove 304a, the ordinary photographic distance focusing condition at the wide-angle end is obtained. Further, when the cam disk 310 continues rotation in the arrowed direction B, the zooming frame 305 arrives at the telephoto end keeping the ordinary photographic distance focusing condition. When the cam disk 310 is rotated from the telephoto end in the arrowed direction A, the front lens group zooming frame 304 is not moved until the applying pin 306b which is in contact with the left side surface of the sliding groove 304a, comes into contact with the right side surface of the sliding groove 304a, and only the front lens group zooming frame 305 is moved from the left in the optical axis direction to the right. Then, when the applying pin 306b comes into contact with the right side surface of the sliding groove 304a, the short distance focusing condition at the telephoto end is obtained. Further, the cam disk 310 continues rotation in the arrowed direction A, the zooming frame 305 arrives at the wide-angle end keeping the short distance focusing condition.

That is, in the example shown in FIG. 13, when the cam disk 310 is rotated clockwise for zooming, the ordinary photographic distance focusing condition is obtained, and when the cam disk 310 is rotated counterclockwise for zooming, the short distance focusing condition is obtained. In contrast to the foregoing, in the example shown in FIG. 14, when the cam disk 310 is rotated clockwise for zooming, the short distance focusing condition is obtained, and when the cam disk 310 is rotated counterclockwise for zooming, the ordinary photographic distance focusing condition is obtained. In the examples shown in FIG. 13 and FIG. 14, when there is no play gap between cam pins 306a and 307a and cam grooves 310a and 310b, the tension spring provided between levers 306 and 307 may be omitted.

Figure 16:
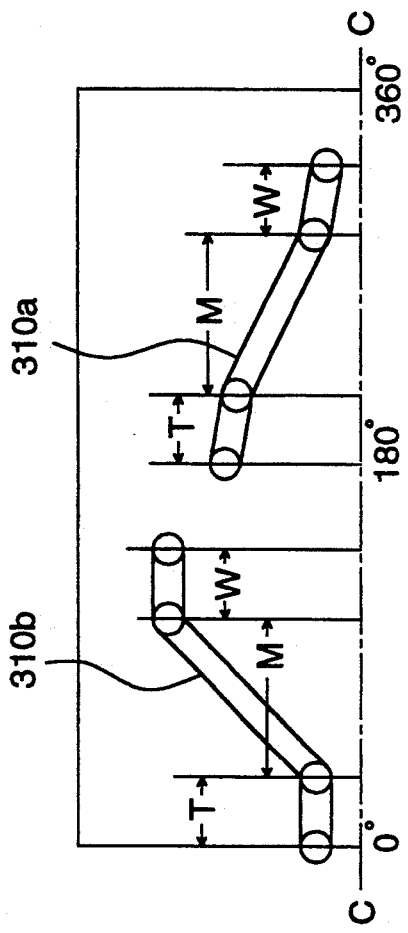
FIG. 16 is a view shown by a Mercator projection showing a shape of a cam of a cam member used in the variable focus lens barrel.

In the variable focusing lens barrel in FIG. 15, the shape of the front lens group cam groove 310a and the rear lens group cam groove 310b is formed into that of a cam, comprising; a tele-focusing section T in which a focusing distance is changed from a short distance to a long distance in an almost constant long focal distance; a wide focusing section W in which the focusing distance is changed from the short distance to the long focal distance in an almost constant short focusing distance; and a variable magnification section M which exists between the foregoing two sections, as cam grooves 310a and 310b shown in FIG. 16 drawn by a Mercator projection method, and the engagement of applying pins 306b and 307b with sliding grooves 304a and 305a is slidingly carried out without any gap between them. The foregoing points are different from the structure shown in FIGS. 13 and 14.

FIG. 15 shows the short distance focusing condition for a telephoto lens in which cam pins 306a and 307a are positioned at the left end of cam grooves shown in FIG. 16. When the cam disk 310 is rotated clockwise from the foregoing condition, cam pins 306a and 307a are moved to the right along the tele-focusing section T of cam grooves 310a and 310b shown in FIG. 16, and the focusing distance is gradually changed to infinity under the state in which the telephoto condition is not changed. Next, the cam pins 306a and 307a are moved from the left to the right along the variable magnification section M. Thereby, when the focal distance is reduced, and the short distance focusing condition is obtained, the cam pins 306a and 307a are moved into a wide-angle focusing section W. When the cam pins 306a and 307a are moved to the right along the wide-angle focusing section, the focusing distance is changed from the short distance to infinity under the state in which the wide-angle condition is not changed, and cam pins arrive at the right end of cam grooves 310a and 310b.

The example shown in FIG. 15 can be applied to the lens barrel in which the focal distance is changed in more than two steps, as in the variable focal distance lens barrel disclosed in Japanese Patent Publication Open to Public Inspection No. 287833/1988. Further, the example can be applied to the lens barrel in which the rotating position of the cam disk 310 is detected by an encoder, and automatic focusing is carried out corresponding to specified magnification information and distance measuring information. In the example shown in FIG. 15, the tension spring provided between levers 306 and 307 can be omitted as in the examples shown in FIGS. 13 and 14.

Figure 17:
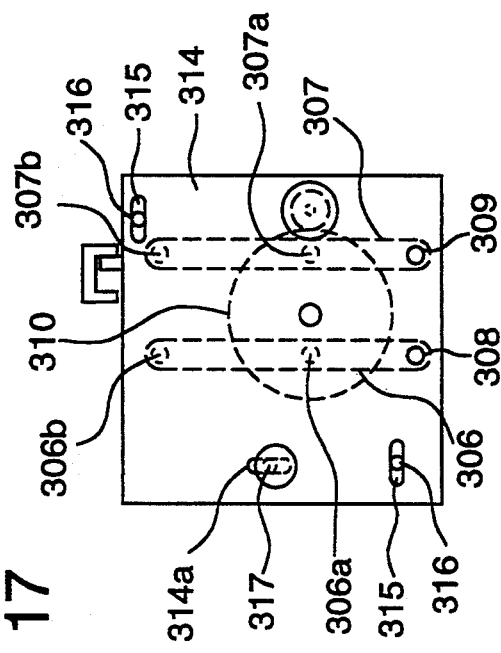
FIG. 17 is a plan view showing a general structure of the zoom lens barrel in an example of the present invention.
Figure 18:
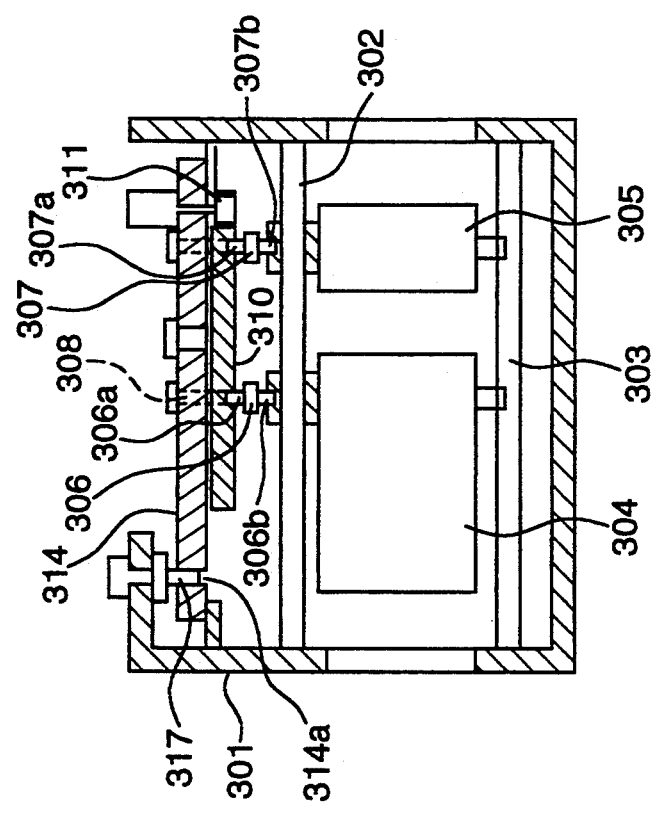
FIG. 18 is a side view showing a general structure of the zoom lens barrel in an example of the present invention.
Figure 19:
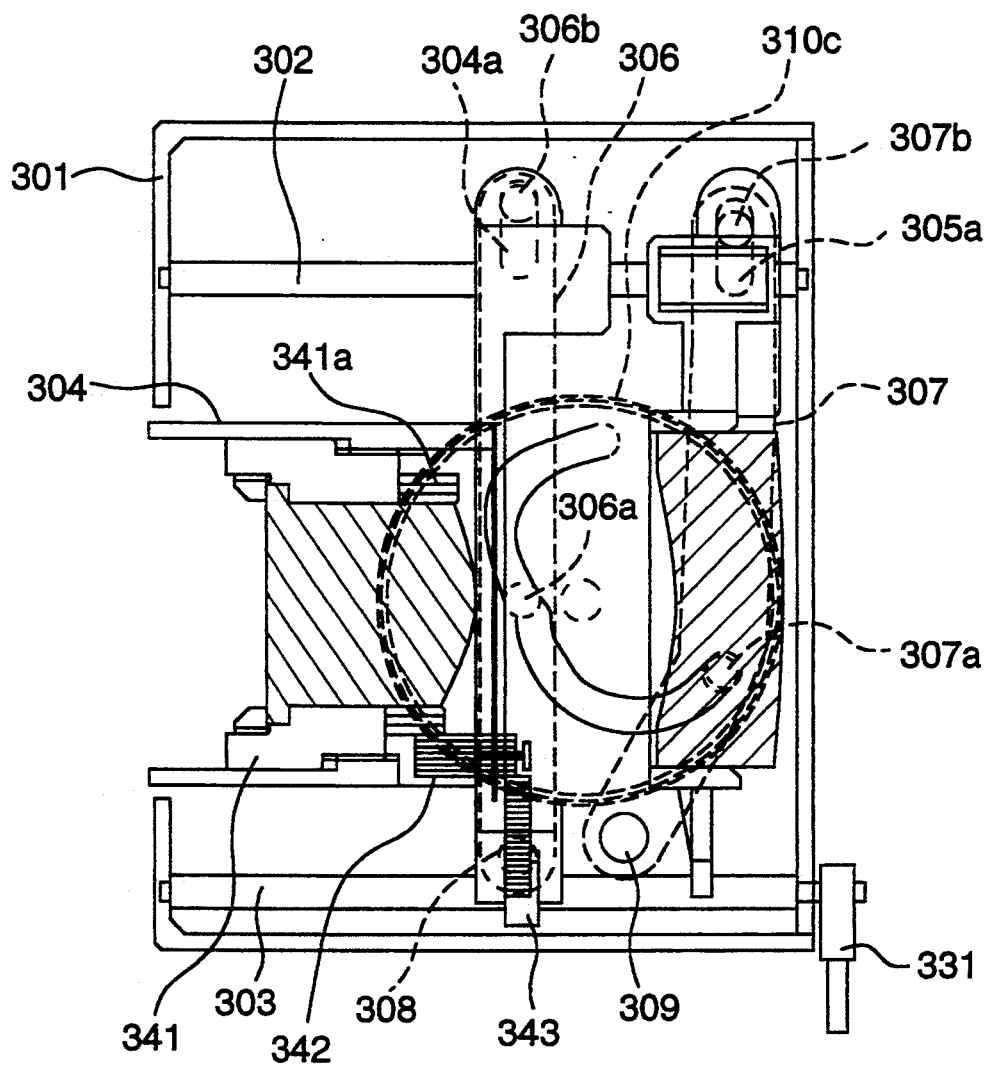
FIG. 19 is a view showing a general structure of the zoom lens barrel in an example of the present invention.
Figure 20:
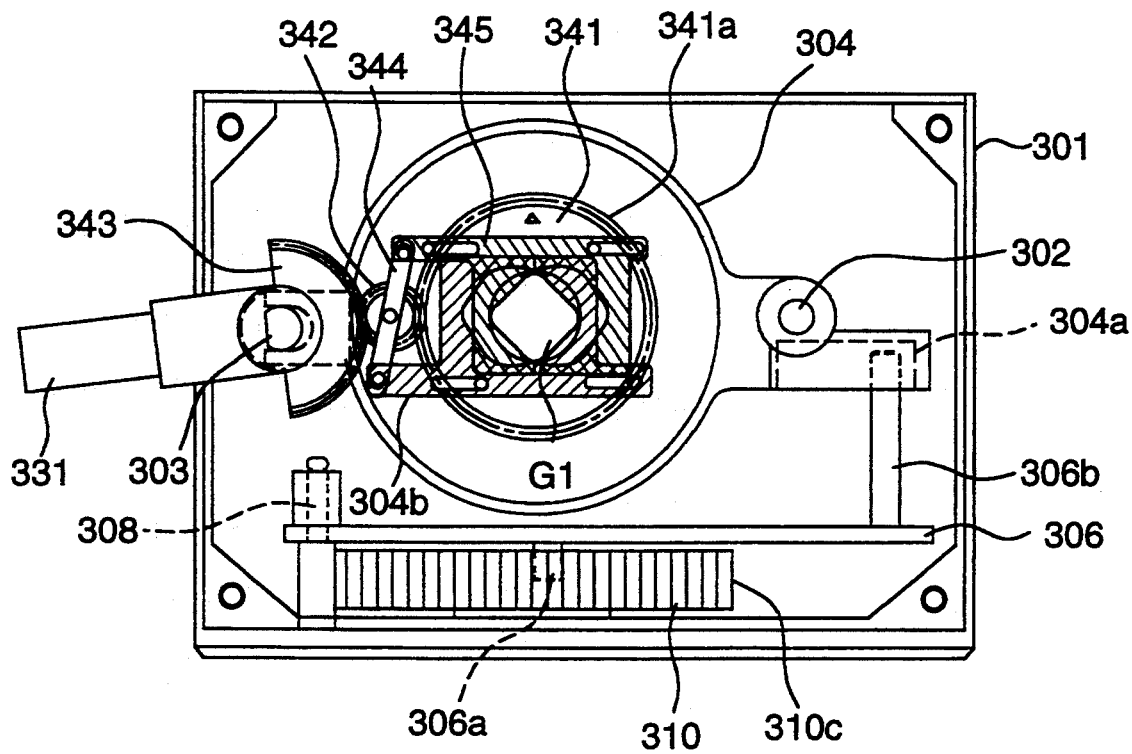
FIG. 20 is a rear view showing the condition of a switching operation of the zoom lens barrel shown in FIG. 19 in an ordinary photographing distance.
Figure 21:
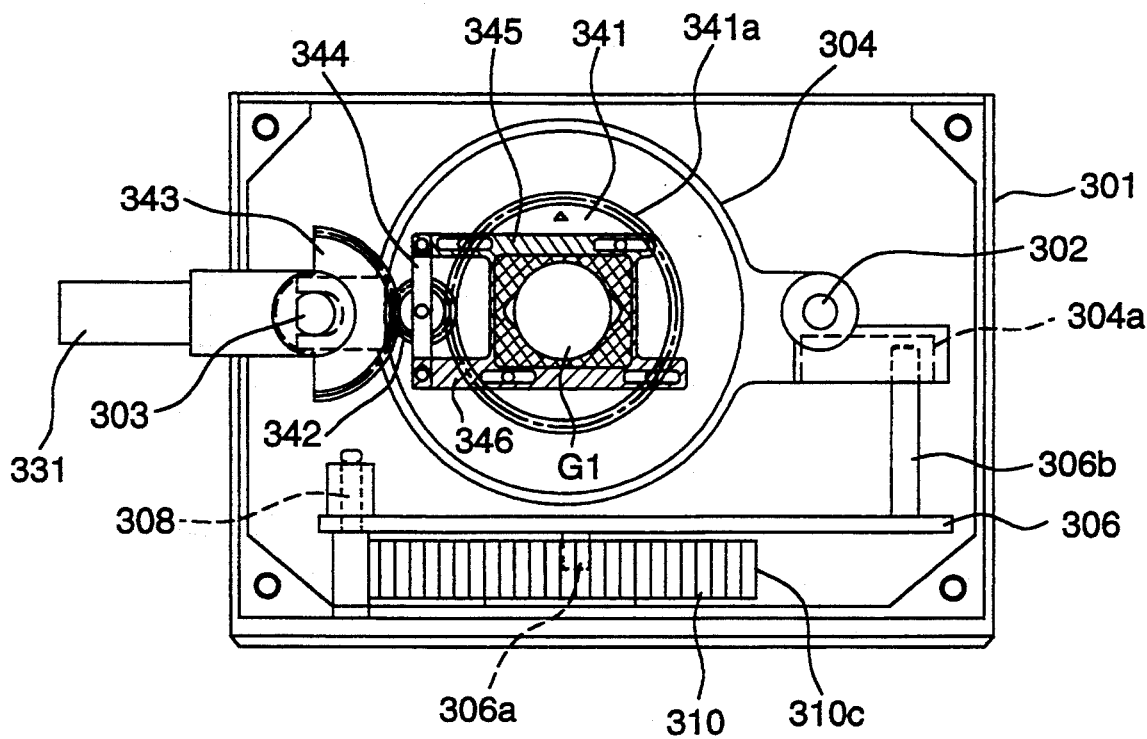
FIG. 21 is a rear view showing the condition of a switching operation of the zoom lens barrel shown in FIG. 19 in an photographing distance using a strobe.
Figure 22:
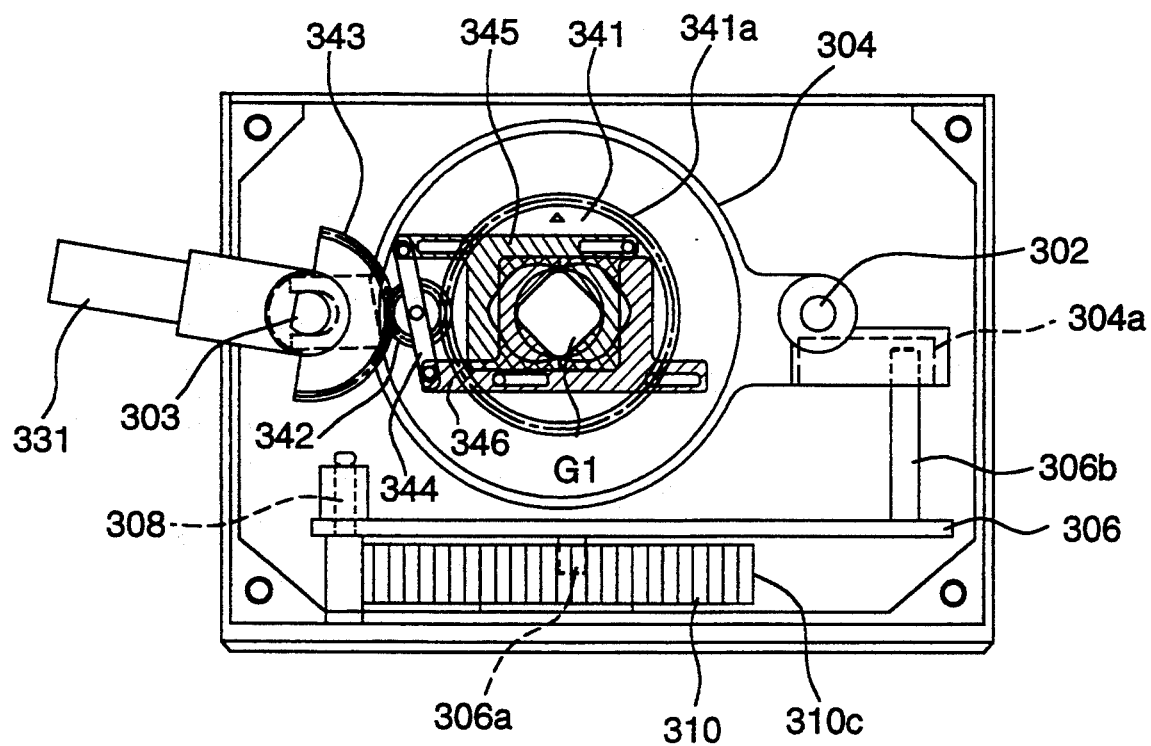
FIG. 22 is a rear view showing the condition of a switching operation of the zoom lens barrel shown in FIG. 19 in a close-up photographing distance.

In the zoom lens barrel shown in FIGS. 17 and 18, levers 306 and 307, and the cam disk 310, in which the relation between cam pins 306a and 307a of levers 306 and 307, the front lens group cam groove 310a and the rear lens group cam groove 310b of the cam disk 310 is the same as that of examples shown in FIGS. 13 and 14, and the relation between applying pins 306b and 307b of levers 306 and 307, sliding grooves 304a and 305a of the front lens group zooming frame 304 and rear lens group zooming frame 305 is the same as that of examples shown in FIGS. 11, 12 and 15, pinion 311, and a driving member such as a reversible motor to drive the pinion 311, are provided to a base 314 which is movable in the direction of the optical axis. The base 314 is moved in the direction of the optical axis when a guide groove 315 provided in the direction of the optical axis between the main frame 301 and the base 314, is slidably engaged with a guide pin 316. When an eccentric pin 317 provided in the main frame 301 so that it can be operated for rotation, is slidably engaged with a guide groove 314a provided to the base 314 in the direction perpendicular to the direction of the optical axis, the base 314 is moved in the direction of the optical axis by rotation of the eccentric pin 317.

That is, the zoom lens barrel shown in FIG. 17 and FIG. 18, can continuously change the focal distance from a telephoto end to a wide-angle end by rotating the cam disk 310, and further, can move the base 314 so that the focusing distance is continuously changed from a short distance to infinity by rotating the eccentric pin 317. Further, automatic focusing can be also easily carried out corresponding to the information of the rotation angle of the eccentric pin 317 obtained by using an encoder, and distance measurement information. Numeral 319 in FIG. 17 is a movement limitation member of the base 314 provided to the main frame 301 so that flange focal length can be adjusted.

In the zoom lens barrel shown in FIG. 19 to FIG. 22, the front lens group G1 is not directly supported by the front lens group zooming frame 304, but it is supported by the front lens group frame 341, and the front lens group frame 341 is supported by the front lens group zooming frame 304 by helicoidal engagement. A peripheral gear 341a is provided around the end of the front lens group frame 341, and a transmission gear 342 which is engaged with the peripheral gear 341a provided around the front lens group frame 341, is rotatably provided in the front lens group zooming frame 304. A guide shaft 303 is rotatably provided, one end of the guide shaft 303 is projected from the main frame 301, and a switching lever 331, by which the guide shaft 303 is rotated, is provided to the projected portion. A switching gear 343 which is integrally rotated with the guide shaft 303, integrally moved with the front lens group zooming frame 303 in the direction of the optical axis, and is engaged with the transmission gear 342, is provided to the guide shaft 303. From the foregoing, in the zoom lens barrel shown in FIG. 19 to FIG. 22, the cam disk 310 is rotated for zooming, the guide shaft 303 is rotated by the switching lever 331, the rotation is transmitted to the front lens group frame 341 by a gear train of the switching gear 343, transmission gear 342, and peripheral gear 341a, and then the front lens group frame 304 is moved forward or backward in the direction of the optical axis by the helicoidal engagement with the front lens group zooming frame 304, so that the focusing distance can be changed from a short distance to infinity.

In the zoom lens barrel shown in FIG. 19 to FIG. 22, a diaphragm member is provided as follows: a swinging member 344 which is integrally swung with the transmission gear 342 is provided; the diaphragm members 345 and 346 which are overlapped and reciprocated in parallel in the opposite direction to each other by swinging the swinging lever 344, are connected with both ends of the swinging lever 344; and the F-number is changed when the shape of an opening formed by overlapping the diaphragm member 345 with 346, each having an oval opening thereon, is changed corresponding to the overlapped condition. From the foregoing, the following operations can be carried out: when the switching lever 331 is switched to the position shown in FIG. 20, the focusing distance becomes the ordinary photographic distance, and the F-number is changed so that the field of depth becomes large; when the switching lever 331 is switched to the position shown in FIG. 21, the focusing distance becomes the strobe light photographing distance, and the diaphragm is almost fully opened to avoid under-exposure; when the switching lever 331 is switched to the position shown in FIG. 22, the focusing distance becomes the macro mode photographic distance, and the diaphragm is closed again to avoid over-exposure.

Figure 23:
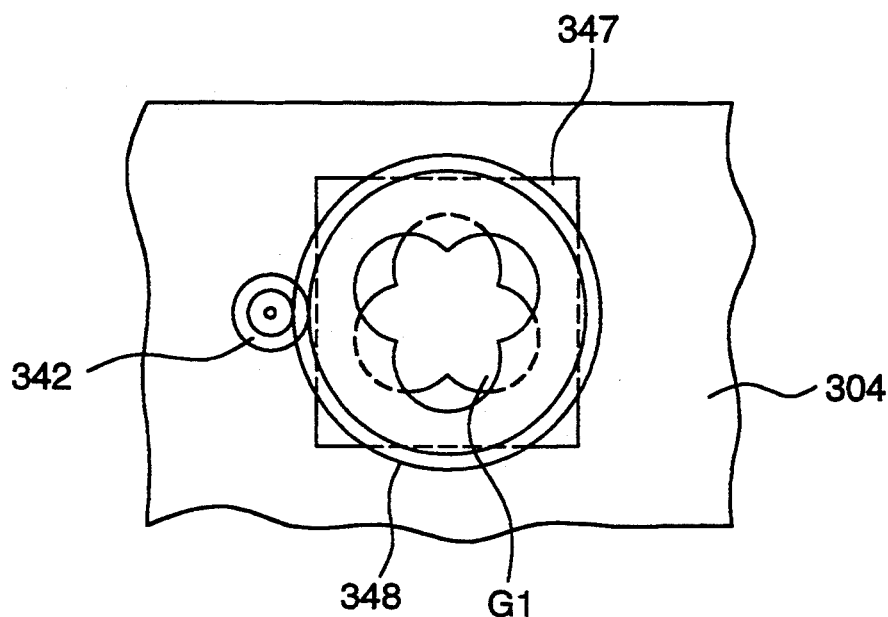
FIG. 23 is a partial rear view showing a closing operation of a diaphragm in another example of a diaphragm member.
Figure 24:
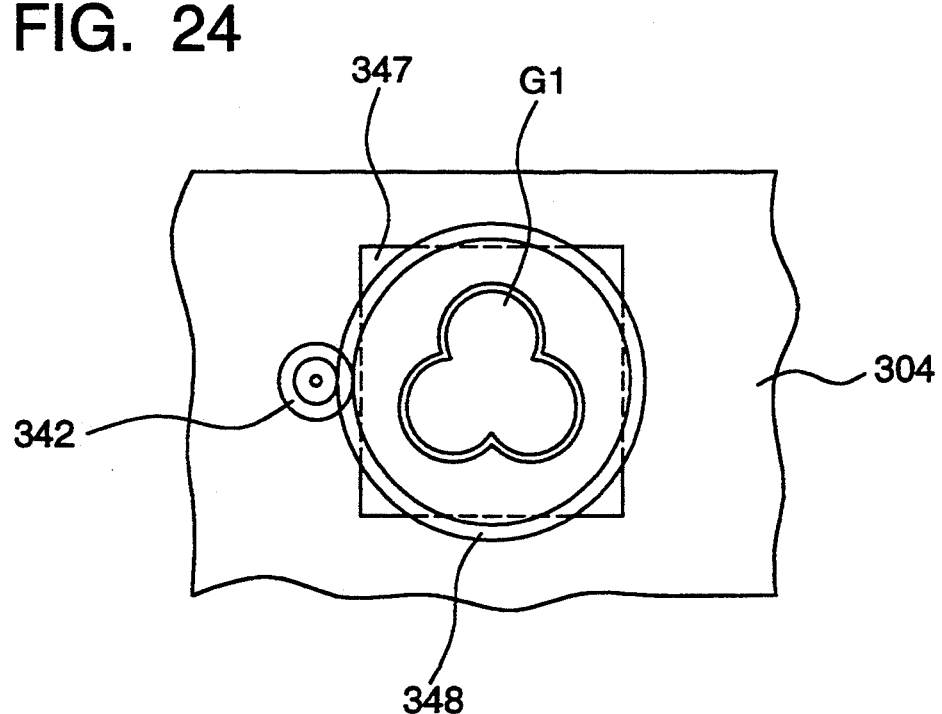
FIG. 24 is a partial rear view showing an opening operation of a diaphragm in another example of a diaphragm member.
Figure 25:
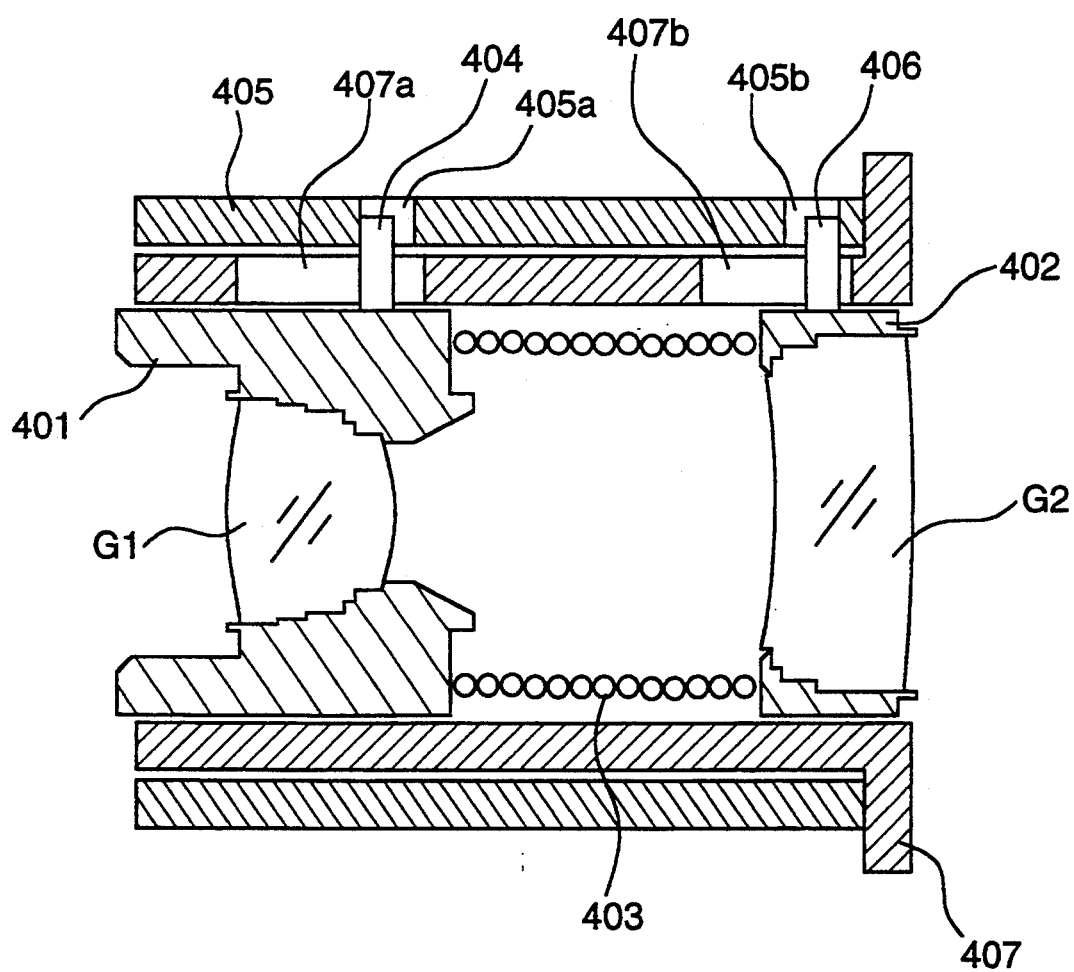
FIG. 25 is a sectional view showing a main structure of a conventional zoom lens barrel.
Figure 26:
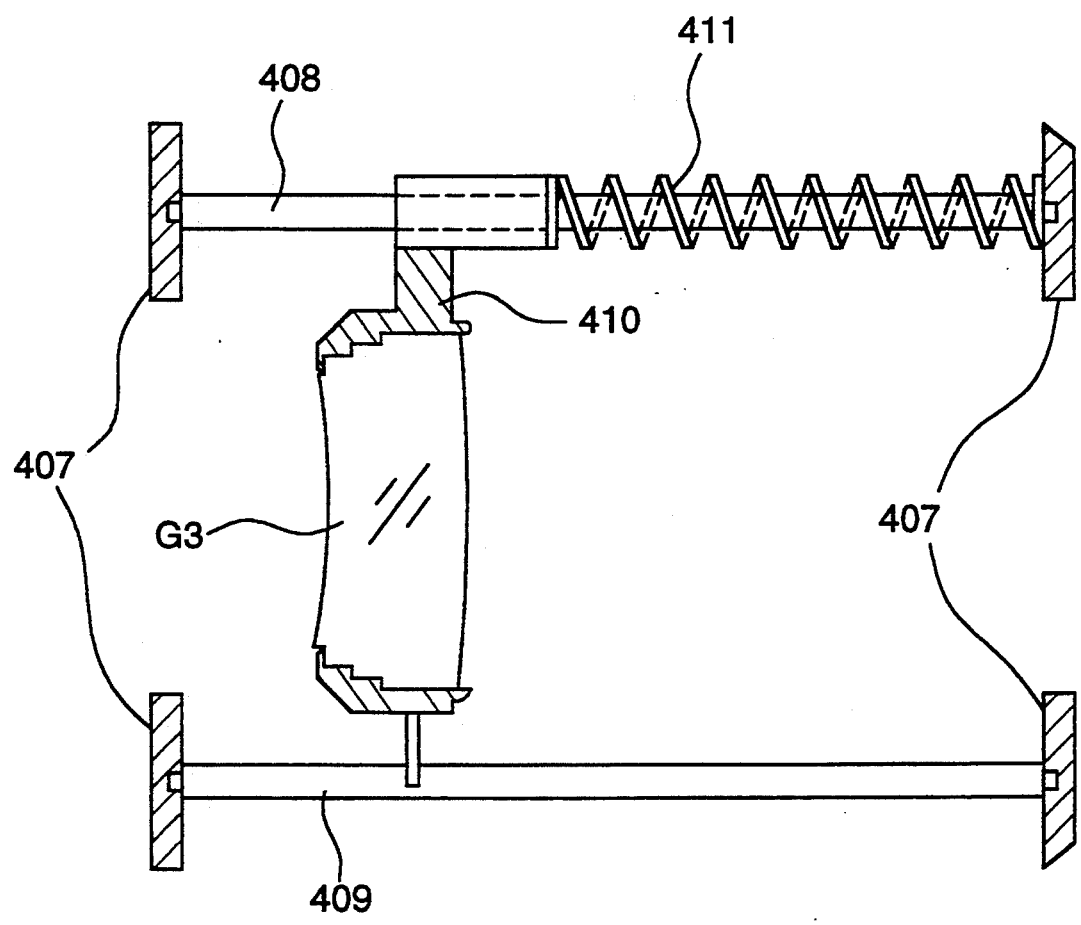
FIG. 26 is a partial sectional view of a conventional zoom lens barrel.

FIGS. 23 and 24 show an example in which one diaphragm member 347 of diaphragm members 347 and 348 is fixed to the front lens group zooming frame 304, and the other diaphragm member 348 is provided to the front lens group zooming frame 304 so that the diaphragm member 348 can be rotated around the optical axis by the transmission gear 342. In this example, also, the diaphragm can be closed as shown in FIG. 23, and opened as shown in FIG. 24 when the switching lever 331 is operated.

Of course, the F-number changing means shown in FIG. 19 to FIG. 24 can be applied to a zooming lens barrel or the variable focal point lens barrel shown in FIG. 11 to FIG. 18. The cam disk shown in FIG. 11 to FIG. 22 may be replaced with a cam cylinder, the rotating shaft of which is in parallel with the optical axis. In this case, the movement of the cam surface, which is in parallel with the swinging surface of the lever, is given by rotation by which the surface of the cam cylinder is contacted with the swinging surface of the lever. Further, of course, in the variable focal point lens barrel of the example, the number of lens groups which are moved in the direction of the optical axis is not limited to two.

In the variable focal point lens barrel of the examples, the focusing distance is switched to the short distance or to the longer distance, and further, the diaphragm is arbitrarily switched, so that variable magnification photographing which is accurately focused at various photographic distances can be carried out. Further, the lens barrel of the invention has advantages in which the structure is simple, the number of parts is small, and the cost is low.

Further, the variable focal point lens barrel, according to the present invention, is suitable to be applied to photographic cameras, single-use cameras, and VTR cameras.

What is claimed is

1. A lens system which controls an exposure value through the lens system at variable focal lengths thereof, said system comprising:
   a base;
   a first lens unit for holding a first lens, movably mounted on said base;
   a second lens unit for holding a second lens, movably mounted on said base;
   means for moving at least one of said first lens unit and said second lens unit to change a focal length of the lens system, provided on said base;
   a first guide means for guiding said first and second lens units in a direction axial to said lens system;
   a second guide means having a guide shaft parallel to the axial direction of said lens system, and having a cam portion formed on said guide shaft;
   means for rotating said guide shaft of said second guide means; and
   controlling means for controlling said exposure value, said controlling means being connected to said guide shaft of said second guide means, wherein a portion of said controlling means complements said cam portion of said guide shaft and slides along said guide shaft in accordance with a movement of at least one of said first lens unit and said second lens unit, and is rotated in accordance with a rotation of said guide shaft, said rotation being controlled by an operation member which senses a suitable exposure and generates a driving force to adjust said controlling means accordingly.

2. The lens system of claim 1, wherein said controlling means is connected to said first lens unit so as to slide along said guide shaft in accordance with a movement of said first lens unit.

3. The lens system of claim 1, wherein said first and second guide means comprise two guide shafts respectively.

4. The lens system of claim 1, wherein said controlling means comprises a shutter means, and said rotating means rotates said guide shaft so as to rotate said shutter means when the release operation is done.

5. The lens system of claim 1, wherein a form of a cross section of said guide shaft which is connected to said controlling means is an irregular form, and a form of a connecting portion of said controlling means is complement to said form of said guide shaft.

6. The lens system of claim 1 wherein said controlling means comprises a diaphragm including a plurality of apertures used as fixed diaphragms, one of said fixed diaphragms being selected in accordance with rotation of said guide shaft.

7. The lens system of claim 1 wherein said controlling means comprises a plurality of diaphragm members for forming an opening used as a diaphragm for transmitting an exposure light, a size of said opening being changed in accordance with the rotation of said guide shaft.

8. The lens system of claim 1 wherein said second guide means comprises two guide shafts, said first and second lens units being guided along said guide shafts.

9. The lens system of claim 8 wherein said controlling means comprises a diaphragm, including a plurality of apertures used as fixed diaphragms, one of said fixed diaphragms being selected in accordance with the rotation of said guide shaft.

10. The lens system of claim 8 wherein said controlling means comprises a plurality of diaphragm members for forming an opening used as a diaphragm for transmitting exposure light, a size of said opening being changed in accordance with the rotation of said guide shaft.

11. The lens system of claim 8, wherein said controlling means is connected to said first lens unit so as to slide along said guide shafts in accordance with a movement of said first lens unit.

12. The lens system of claim 8, wherein said controlling means comprises a shutter means connected to one of said guide shafts, and said rotating means rotates said guide shaft so as to rotate said shutter means when the release operation is done.

13. The lens system of claim 8, wherein a form of a cross section of said guide shaft which is connected to said controlling means is an irregular form, and a form of a connecting portion of said controlling means is complement to said form of said guide shaft.

14. The lens system of claim 8 wherein said moving means comprises
   a plate member having a first groove and a second groove, provided on said base rotatably;
   means for rotating said plate member;
   a first arm member having a first end portion, a second end portion and a projection between said first end portion and said second end portion, wherein said first arm member is pivotaly provided on said base at said first end portion and said second end portion of said first arm member is connected to said first lens unit, and said projection of said first arm member is engaged in said first groove of said plate member so that said first arm member is rotated and said first lens unit is moved in accordance with a rotation of said plate member; and a second arm member having a first end portion, a second end portion and a projection between said first end portion and said second end portion, wherein said second arm member is pivotaly provided on said base at said first end portion and said second end portion of said second arm member is connected to said second lens unit, and said projection of said second arm member is engaged in said second groove of said plate member so that said second arm member is rotated and said second lens unit is moved in accordance with a rotation of said plate member.

15. The lens system of claim 6 further comprising:
means for selecting one of said fixed diaphragms to be used in photographing, wherein said selecting means is connected to said guide shaft, and one of said fixed diaphragms is selected in accordance with the rotation of said guide shaft.

16. The lens system of claim 7, further comprising:
means for changing a size of said diaphragm to be used in photographing, wherein said changing means is connected to said guide shaft, and said size of said diaphragm is changed in accordance with the rotation of said guide shaft.

17. The lens system of claim 9, further comprising:
means for selecting one of said fixed diaphragms to be used in photographing, wherein said selecting means is connected to one of said guide shafts, and one of said fixed diaphragms is selected in accordance with the rotation of said guide shaft.

18. The lens system of claim 10, further comprising:
means for changing a size of said diaphragm to be used in photographing, wherein said changing means is connected to one of said guide shafts, and said size of said diaphragm is changed in accordance with the rotation of said guide shaft.

19. A lens system for changing a focal length thereof comprising:
a base;
a guide shaft;
a first lens unit for holding a first lens, mounted movably to said base along said guide shaft;
a plate member having a first groove, provided on said base rotatably;
means for rotating said plate member;
a first arm member having a first end portion, a second end portion and a projection between said first end portion and said second end portion, wherein said first arm member is pivotaly provided on said base at said first end portion and said second end portion of said first arm member is connected to said first lens unit, and said projection of said first arm member is engaged in said first groove of said plate member so that said first arm member is rotated and said first lens unit is moved in accordance with a rotation of said plate member.

20. The lens system of claim 19, wherein said plate member is a disk.

21. The lens system of claim 19, further comprising:
a second lens unit for holding a second lens;
a second arm member having a first end portion, a second end portion and a projection between said first end portion and said second end portion, wherein said second arm member is pivotaly provided on said base at said first end portion and said second end portion of said second arm member is connected to said second lens unit, and wherein said plate member includes a second groove and said projection of said second arm member is engaged in said second groove of said plate member so that said second arm member is rotated and said second lens unit is moved in accordance with a rotation of said plate member.

22. The lens system of claim 21, further comprising:
means for forcing said first and second arm members oppositely to each other so as to contact said projections with one side of said first and second grooves respectively.

23. The lens system of claim 22, wherein said forcing member comprises a spring.

24. The lens system of claim 22, wherein said pressing member changes the pressing direction of said projection of said first arm member from said one side of said first groove to another side thereof.

25. The lens system of claim 21, further comprising:
means for changing the focal length of said lens unit, wherein said rotating means is actuated when said changing means is initiated.

26. The lens system of claim 21, further comprising:
means for transmitting a rotation of said guide shaft to said first lens unit.

27. The lens system of claim 26, wherein said lens unit is moved in an axial direction of said lens system for focusing an object in accordance with the rotation of said guide shaft.

28. The lens system of claim 27, wherein said transmitting means comprises a gear member.

29. The lens system of claim 21, wherein said base includes a movable plate mounting said rotatable plate member, said first and second arm members and said rotating means thereon.

30. The lens system of claim 29, further comprising:
means for moving said movable plate to said base so that said first and second lens units are moved to said base along said guide shaft in accordance with the movement of said movable plate.

* * * * *